INVENTOR
W. M. GOODALL
BY William F. Simpson,
ATTORNEY

INVENTOR
W. M. GOODALL
BY William F. Simpson
ATTORNEY

Oct. 11, 1955 W. M. GOODALL 2,720,557

TIME DIVISION PULSE CODE MODULATION SYSTEM EMPLOYING CONTINUOUS CODING TUBE

Filed Dec. 24, 1948 18 Sheets-Sheet 3

INVENTOR
W. M. GOODALL
BY William F. Simpson
ATTORNEY

Oct. 11, 1955    W. M. GOODALL    2,720,557

TIME DIVISION PULSE CODE MODULATION SYSTEM
EMPLOYING CONTINUOUS CODING TUBE

Filed Dec. 24, 1948    18 Sheets-Sheet 4

INVENTOR
W. M. GOODALL
BY William F. Simpson
ATTORNEY

Oct. 11, 1955 W. M. GOODALL 2,720,557

TIME DIVISION PULSE CODE MODULATION SYSTEM EMPLOYING CONTINUOUS CODING TUBE

Filed Dec. 24, 1948 18 Sheets-Sheet 5

INVENTOR
W. M. GOODALL
BY William F. Simpson.
ATTORNEY

INVENTOR
W. M. GOODALL
BY William F. Simpson.
ATTORNEY

Oct. 11, 1955 W. M. GOODALL 2,720,557

TIME DIVISION PULSE CODE MODULATION SYSTEM EMPLOYING CONTINUOUS CODING TUBE

Filed Dec. 24, 1948 18 Sheets-Sheet 7

INVENTOR
W. M. GOODALL
BY William F. Simpson
ATTORNEY

Oct. 11, 1955 W. M. GOODALL 2,720,557

TIME DIVISION PULSE CODE MODULATION SYSTEM EMPLOYING CONTINUOUS CODING TUBE

Filed Dec. 24, 1948 18 Sheets-Sheet 8

INVENTOR
W. M. GOODALL
BY William F. Simpson
ATTORNEY

INVENTOR
W. M. GOODALL
BY William F. Simpson.
ATTORNEY

INVENTOR
W. M. GOODALL
BY William F. Simpson
ATTORNEY

Oct. 11, 1955

W. M. GOODALL 2,720,557

TIME DIVISION PULSE CODE MODULATION SYSTEM EMPLOYING CONTINUOUS CODING TUBE

Filed Dec. 24, 1948

18 Sheets-Sheet 11

INVENTOR
W. M. GOODALL
BY William F. Simpson
ATTORNEY

Oct. 11, 1955 W. M. GOODALL 2,720,557

TIME DIVISION PULSE CODE MODULATION SYSTEM
EMPLOYING CONTINUOUS CODING TUBE

Filed Dec. 24, 1948 18 Sheets-Sheet 12

INVENTOR
W. M. GOODALL
BY William F. Simpson.
ATTORNEY

Oct. 11, 1955 W. M. GOODALL 2,720,557

TIME DIVISION PULSE CODE MODULATION SYSTEM
EMPLOYING CONTINUOUS CODING TUBE

Filed Dec. 24, 1948 18 Sheets-Sheet 13

INVENTOR
W. M. GOODALL
BY William F. Simpson
ATTORNEY

INVENTOR
W. M. GOODALL
BY William F. Simpson
ATTORNEY

INVENTOR
W. M. GOODALL
BY William F. Simpson
ATTORNEY

Oct. 11, 1955 W. M. GOODALL 2,720,557

TIME DIVISION PULSE CODE MODULATION SYSTEM EMPLOYING CONTINUOUS CODING TUBE

Filed Dec. 24, 1948 18 Sheets-Sheet 16

INVENTOR
W. M. GOODALL
BY William F. Simpson
ATTORNEY

INVENTOR
W. M. GOODALL
BY William F. Simpson
ATTORNEY

Oct. 11, 1955 W. M. GOODALL 2,720,557

TIME DIVISION PULSE CODE MODULATION SYSTEM EMPLOYING CONTINUOUS CODING TUBE

Filed Dec. 24, 1948 18 Sheets-Sheet 18

INVENTOR
W. M. GOODALL
BY William F. Simpson
ATTORNEY

United States Patent Office 2,720,557

Patented Oct. 11, 1955

2,720,557

TIME DIVISION PULSE CODE MODULATION SYSTEM EMPLOYING CONTINUOUS CODING TUBE

William M. Goodall, Oakhurst, N. J., assignor to Bell Telephone Laboratories, Incorporated, New York, N. Y., a corporation of New York Application December 24, 1948, Serial No. 67,211

15 Claims. (Cl. 179—15)

This invention relates to a communication system and more particularly to a communication system in which complex wave forms are transmitted by code groups of pulses transmitted at rapidly recurring instants of time.

An object of this invention is to provide an improved and simplified means and methods for representing complex wave forms by means of code groups of different signaling conditions which improved means and methods are capable of operating at high speed.

Another object of this invention is to provide improved decoding equipment which is capable of operating at high speed for recovering the complex wave form represented by coded groups of different signaling conditions of short duration occurring in rapid succession.

A feature of this invention relates to a cathode-ray tube which is capable of substantially continuously and instantaneously representing a complex wave form by a complete code group of different signaling conditions. The cathode-ray tube is of a type which is provided with a target and electrodes which at substantially all times have applied to them electrical conditions representing a complete code group, determined by the instantaneous amplitude of the complex wave form.

Another feature of this invention relates to a cathode-ray coding tube wherein the coding target is arranged to cause certain codes, i. e., the end codes, to be extended so that these codes will be formed when the applied signal exceeds the operating range of the tube.

Features of the coding tube disclosed but not claimed herein which are novel are claimed in my copending application Serial No. 37,035, filed July 3, 1948, now patent No. 2,616,060, granted October 28, 1952.

Another feature of this invention relates to circuits and apparatus and methods of changing code groups of pulses of one code into code groups of pulses of a different code.

Another feature of this invention relates to circuits, apparatus and methods of changing from a second coded group of pulses back to the first code group of pulses.

Another feature of this invention relates to methods, circuits and apparatus for periodically checking and automatically setting the translating circuits.

Another feature of this invention relates to equipment for changing a code group of signaling conditions simultaneously present at an instant of time into a code group of signaling conditions occurring one after another in sequence by means of transmitting the signaling conditions through delay networks, lines or devices having different delay intervals.

Another feature of this invention is to combine pulses of different signaling conditions received in sequence one after another into a single pulse by transmitting the various pulses received through delay networks, lines or devices of different delay intervals so that pulses arrive at the output of the delay devices substantially simultaneously.

Briefly, in accordance with the invention described herein a complex wave form is employed to control the generation of code signals. The magnitude or amplitude of a complex signaling wave such as a speech wave, telegraph wave, or other complex signaling wave is represented by means of code groups of signals each signal of which may comprise any number of a plurality of frequency division multiplex signals, time division multiplex signals, or different signaling conditions.

While the invention described herein is not limited to any particular code or groups it is usually convenient to employ a uniform code each code group of which has the same number of signals and each code group of which represents a predetermined amplitude of the complex signaling wave. That is, each code group is of a uniform number of different signals or a predetermined number of pulses in which each of the signals or pulses may comprise signaling conditions of any of a plurality of different signaling conditions.

In the specific embodiment set forth herein it is assumed that these code groups may comprise five or less signals or pulses and that each pulse or signal may comprise either one of the two signaling conditions and may be transmitted during the time assigned to the various pulses or pulse positions.

In such a system any suitable code may be employed wherein the different code groups are assigned to represent the different amplitudes of the complex wave form. In the specific embodiment set forth herein the coding and decoding equipment is arranged to generate and respond to the binary code in which each of the signals or pulses represents or is analogous to a digital position of a binary number and one signaling condition represents one magnitude of a digit and the other signaling condition represents another magnitude of a digit.

In order to more readily describe and follow the various signals and signaling conditions employed in forming and transmitting code groups of signaling conditions, pulses of one character are frequently called marking pulses, on pulses, or current pulses, while the pulses of the other signaling condition are frequently called spacing pulses, off pulses, or pulses of no current. Sometimes these two pulses are called positive pulses and negative pulses. The signals or signaling conditions as they are being transmitted through the various circuits and apparatus of the system may be represented by different signaling conditions. It is frequently most convenient to refer to each pulse as marking or spacing signals.

In accordance with the present invention the code groups of signals may be all generated substantially instantaneously under control of the complex wave or they may be generated at predetermined times in rapid succession so that the amplitude of the complex signaling wave can be represented by a group of signals or pulses occurring at a plurality of rapidly recurring instants of time. The rapidity of the recurrences of the code groups representing any complex signaling wave determines the highest frequency component of the signaling wave which may be transmitted over the system. In general, the frequency of this component is somewhat less than half the highest recurrence rate of transmitted pulse or signal groups representing the amplitude of the complex wave. Thus, for example, if it is desired to transmit a frequency range of up to 5,000 to 5,500 cycles then the coding equipment should generate complete code groups of pulses or signal conditions at a rate of at least 12,000 codes each second.

It is to be understood, of course, that any suitable frequency range may be employed.

The foregoing objects and features of this invention, the novel features of which are specifically pointed out in the claims appended hereto, may be more readily understood from the following description when read with reference to the attached drawings in which:

Fig. 1 shows the manner in which Figs. 4 through 13 are arranged adjacent one another;

Figs. 2 and 3 show in outline form the various elements of an exemplary system embodying the present invention. Fig. 2 shows the various elements in the manner in which they cooperate one with another at the transmitting station or near the end of the system while Fig. 3 shows the manner in which the various elements of the system cooperate with each other at the receiving or distant end of the system. As shown in Figs. 2 and 3, as well as in other figures of the drawing, the equipment and apparatus required for the transmission of the signals or complex wave form in one direction only is shown in the drawing. It is to be understood, however, that this equipment will be duplicated for transmission in the opposite direction and that equipment such as shown in the drawing together with a duplicate thereof for transmission in the opposite direction may be readily combined in a well understood manner to provide a two-way transmission path between the ends of the system;

Figs. 4 through 13 when positioned as shown in Fig. 1 show in detail the various circuits and the method in which they cooperate to form an exemplary system embodying the present invention;

Figs. 5 through 9 show in detail the equipment at the transmitting station while

*General description*

Figures 1, 2, 3, 17, 22:
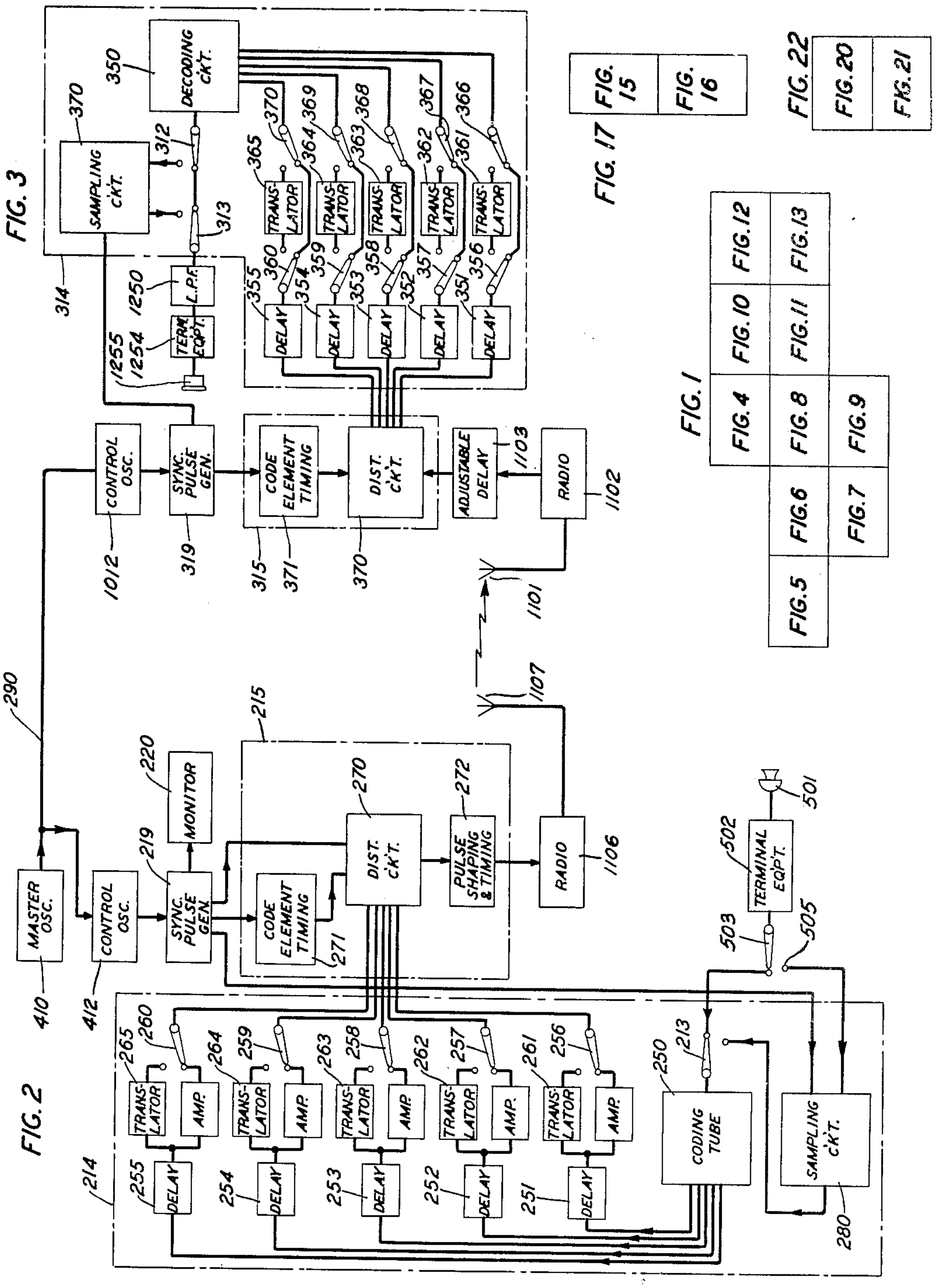
Figs. 15 through 21 show graphs of voltages and currents at various positions in the system illustrating the mode of operation of the various circuits and the manners in which they cooperate with each other.

Figs 2 and 3 show in outline form the various component circuits in the manner in which they cooperate to form an exemplary system in accordance with the present invention. Fig. 2 shows the transmitting equipment including the coding apparatus. Fig. 3 shows the corresponding equipment at the receiving terminal including the receiving synchronizing and controlling equipment, and the decoding apparatus and equipment for reconstructing the original communication signals or wave forms. In Fig. 2, 210 represents the source of signal which is usually a microphone for voice signals, but may include any other suitable source of signals including telegraph signals, picture signals, facsimile signals, frequency division multiplex signals, etc. The source of signals 210 is connected to the terminal equipment 211 by means of any suitable type of transmission circuits and paths including telephone open-wire lines, cable circuits, carrier current communication paths, radio paths, toll circuits, etc. The terminal equipment 211 may include various types of switching equipment for establishing communication paths from the source 501 to the terminal equipment in the exemplary system set forth herein. Each of these systems as well as the associated equipment operates in its usual and well understood manner so that it is not necessary to repeat a description of the operation thereof herein.

The output of the terminal equipment 502 is transmitted through switches 503 and 213, which switches when set in the position shown in the drawing, cause signaling currents of a complex signaling wave form such as speech currents to be transmitted from the transmitter or signal source 501 through the terminal equipment 502 and switches 503 and 213 to the coding and differentiating circuit 214.

Coding and differentiating circuit 214 comprises a coding tube 250 to which the signaling wave is applied. In response to the signaling wave applied to this tube a plurality of voltages are applied to the output electrodes of the tube. The tube is provided with a plurality of these electrodes which are connected in a circuit such that they either have one or the other of two different voltages applied to them depending upon the amplitude of the applied signaling wave. The combination of voltages applied to the output electrodes of the tube correspond to the magnitude of the instantaneous voltage applied to the input of the coding tube. The voltages appearing on the output electrodes are in accordance with the input voltage and a predetermined code. The output voltages are applied substantially simultaneously to all of the output electrodes of the tube so that the output of the tube at all times represents the instantaneous amplitude of a complex signaling wave.

Since the voltages representing the amplitude of the complex signaling wave at each instant of time appear substantially simultaneously at the respective output electrodes of the coding tube and since it is desired to send signals representing these voltages in succession, a plurality of delay devices 251 through 255 are connected to the output of the coding tube 250. These delay devices all have different delay intervals. In a specific embodiment of the invention the delay intervals between the various delay devices are equal to the time allowed to each code pulse or to interval multiples thereof. The delay of the various delay devices may be arranged in any desired predetermining order in which the voltage characteristic of the respective output electrodes of the coding tube 250 are transmitted over the communication system. In other words, the voltages representing the various codes are applied substantially simultaneously to the input of these delay devices but the voltages appear at the output terminals of these delay devices in succession. The devices may be arranged in any order so that the pulses follow one another in succession at the output terminals of the adjacent ones of said devices. However, when desired, these delay devices may be arranged in any desired order. With the switches 256 through 260 positioned as shown in the drawing the outputs of the delay devices are repeated and amplified and transmitted to the distributor circuit 270 in succession. The distributor circuit 270 comprises a portion of the multiplex control equipment 215 at the transmitting station. This system also includes a code element timing circuit 271 and pulse forming and timing circuit 272. From the distributor 270 the pulses are transmitted in succession in the form of code groups each code group of which represents a predetermined amplitude of the signaling wave applied to the coding tube 250. The synchronizing and multiplex system 215 also includes the code element timing circuit 271 and a pulse shaping and tuning circuit 272.

Provision has also been made to form code groups of pulses which pulses represent the change in amplitude of the complex wave during predetermined intervals of time. When it is desired to transmit such pulses, switches 256 through 260, inclusive, are moved to positions opposite to the positions shown in the drawing. As a result the output of delay devices 251 through 255 must first pass through the respective translating circuits 261 through 265 which circuits cause a pulse to be transmitted each time the output of each delay device 251 through 255 changes in character. These pulses are then transmitted to the transmitting distributor 270 when the switches 256 through 260 are moved to the positions opposite to the positions shown in the drawing. Thereafter, the pulses are transmitted over the system substantially the same as described herein.

A sampling circuit 280 has also been provided and when switches 503 and 213 are moved to their positions opposite to the positions shown in the drawing the signals from the terminal equipment 502 are first transmitted to the sampling circuit 280. Under these circumstances, signals from the terminal equipment are first applied to the sampling circuit 280 which causes an output voltage to be developed across its output terminals which voltage is a function of the instantaneous amplitude of the complex signaling wave. The sampling circuit is controlled by currents or pulses received from the synchronous pulse generator 219. The output of the sampling circuit 280 is connected to switch 213. When this switch is operated to the position opposite the position shown in the drawing, the output of the sampling circuit 280 is applied to the coding tube 250. By properly timing the synchronizing pulses or control currents the various circuits of the system may be arranged so that the complex wave is first sampled and then the amplitude of the sample applied to the coding tube. The resulting output voltages are then used to control the character of the pulses of a code group of pulses transmitted over the system. Thereafter the sampling circuit again samples the complex wave after which another group of voltages is generated by the coding tube 250. The character of these voltages is then employed to control the signals transmitted over the radio system as described herein.

The synchronous pulse generator 219 in addition to controlling the sampling circuit 270 also controls a code element timing circuit 271 which circuit together with the synchronous pulse generator circuit 219 controls the transmitting and multiplex system 270. The timing and synchronizing of the transmitting equipment at the station shown in Fig. 2 is controlled by a master oscillator 217, control oscillator 218, synchronous pulse generator 219 and other control equipment which will be described hereinafter.

The output pulse code signals are transmitted over a communication path extending to a distant station. The apparatus 1106 is arranged to convert the code signals into high frequency signals or other signals suitable for transmission over open-wire lines, coaxial cable circuits, wave guides, ultra-high frequency radio waves, etc.

At the receiving station signals are received by radio antenna 1101 or from any other type of communication path which is employed for their transmission. These signals are transmitted through various receiving circuits including the radio circuit 1102, adjustable delay circuit 1103 to the multiplex equipment 315, and decoding equipment and integrating apparatus 314. The adjustable delay device 1103 is provided to control the propagation time between the transmitting and receiving station. By providing this equipment the same synchronizing equipment 1012, 319, etc., may be made common to a number of circuits from different distant stations.

The receiving multiplex equipment 315 is controlled by control oscillator 1012, and the synchronous pulse generator circuit 319. While any suitable receiver of the prior art may be employed to receive the signals transmitted from the transmitting station of Fig. 2, an improved receiving station and equipment is described herein. Of course, this receiving equipment may be employed to receive from other suitable transmitters of the prior art when desired. However, the improved receiver set forth herein has novel features and cooperates in novel manners with the transmitter disclosed herein. The receiving multiplex equipment 315 comprises code element timing circuit 371 and distributor circuit 370, which circuits operate to transmit the respective pulses to the respective output leads in succession. These pulses are then transmitted through delay devices 355 through 351, inclusive, which delay devices have different time delay intervals and in the exemplary embodiment of the invention set forth herein these delay intervals are such that the delay interval of the delay devices such as 255 at the transmitting end and the delay of the corresponding device at the receiving end such as 355 is substantially constant for each of the pairs of delay devices.

When the signals transmitted represent the amplitude of the complex wave form, switches 356 through 360 and 366 through 370, inclusive, are positioned as shown in the drawing so the outputs of the delay devices are transmitted from the switches to the decoding circuit 350 and the output of this circuit is in turn transmitted through the low-pass filter 1250 and terminal equipment 1254. When the switches of tubes 256 through 260, inclusive, are operated away from the positions shown in the drawing and to their other positions, the corresponding switches 356 through 360 as well as switches 366 through 370 are operated to their opposite positions at which times the signals are transmitted through the translating devices 361 through 366 and pulses similar to the original code pulses recovered and applied to the decoding circuit 350. In order to improve the operation of the decoding circuit at this time an output sampling circuit 370 has been provided which circuit, when switches 312 and 313 are operated to their opposite positions opposite to the positions shown in the drawing causes the output of the decoding device 350 to be transmitted through the sampling circuit 370 and then through the low-pass filter 1250 in the terminal equipment 1254 to the receiving device 1255. The decoded pulses upon being transmitted from the low-pass filter 308 cause complex wave forms similar to those applied to the coding tube 250 to be reconstructed and then transmitted through the terminal equipment to the receiving device 1255.

In addition to the main signaling path between the transmitting and receiving stations shown in Figs. 2 and 3 a synchronizing path or channel 290 is shown extending between two stations in Figs. 2 and 3. This control path or channel may be similar to the other transmission paths between the stations. Furthermore, if it is so desired the synchronizing signals or the control frequency may be transmitted over one or more of the other transmission paths extending between the two stations. Inasmuch as there are numerous types of synchronizing apparatus in the prior art which will operate over the same transmission paths as employed for the transmission of communication signals and since the operation of this type of equipment is well known and understood by persons skilled in the art, it is considered unnecessary to further expand the present disclosure to show details of a typical system of this type. It is understood, of course, that such equipment will cooperate with the various circuits of the present invention and may be provided when it is so desired.

Each of the stations is provided with certain control equipment which may be common to all of the circuits terminating at that station or it may be common to a plurality of the circuits terminating thereafter. Of course, this common equipment may be provided for each of the individual circuits if it is so desired as is well understood by persons skilled in the art. However, in the systems shown in Figs. 2 and 3 the control circuits and equipment are shown at the top of these figures and may be common to all of the channels which terminate at each of the respective stations.

The common equipment at the station of Fig. 2 comprises a control oscillator 412 which may be of any suitable type, as for example, the types described in detail in any one or more of the following patents: 1,476,721, Martin, December 11, 1923; 1,660,389, Matte, February 28, 1928; 1,684,455, Nyquist, September 18, 1928 and 1,740,491, Affel, December 24, 1929.

The output of the control oscillator is coupled to control a synchronous pulse generator 219. The output of this generator extends to the transmitting distributor circuit 270, sampling circuit 280 and monitoring equipment 220. The synchronous pulse generator may include one or more delay devices. These delay devices as well as the other delay devices shown in the drawing may be any suitable type of delay network as, for example, one or more sections of one or more of the types disclosed in United States Patent 1,770,422, granted July 18, 1930, to Nyquist.

Similar common equipment comprising a control oscillator 1012 and synchronous pulse generator 319, is provided at the station shown in Fig. 3.

In addition to the control oscillators 412 and 1012 at each of the control stations, a master oscillator 410 is shown in Fig. 2. This master oscillator may be located at either of the stations of Figs. 2 or 3 and when so located at either of these stations, may replace the control oscillator 412 or 1012 at either of these stations. However, the master oscillator is frequently located at some central point and provides a control frequency for the entire nationwide system or for some smaller divisions of a large system. Typical oscillators and standard frequency systems suitable for use as a master oscillator or source of control frequency are disclosed in United States Patents 1,788,533, Marrison, January 13, 1931; 1,931,873, Marrison, October 24, 1933; 2,087,326, Marrison, July 20, 1937; 2,163,403, Meacham, June 20, 1939; and 2,275,452, Meacham, March 10, 1942.

All of the patents referred to above are hereby made a part of the present application as if fully included herein.

Figure 5:
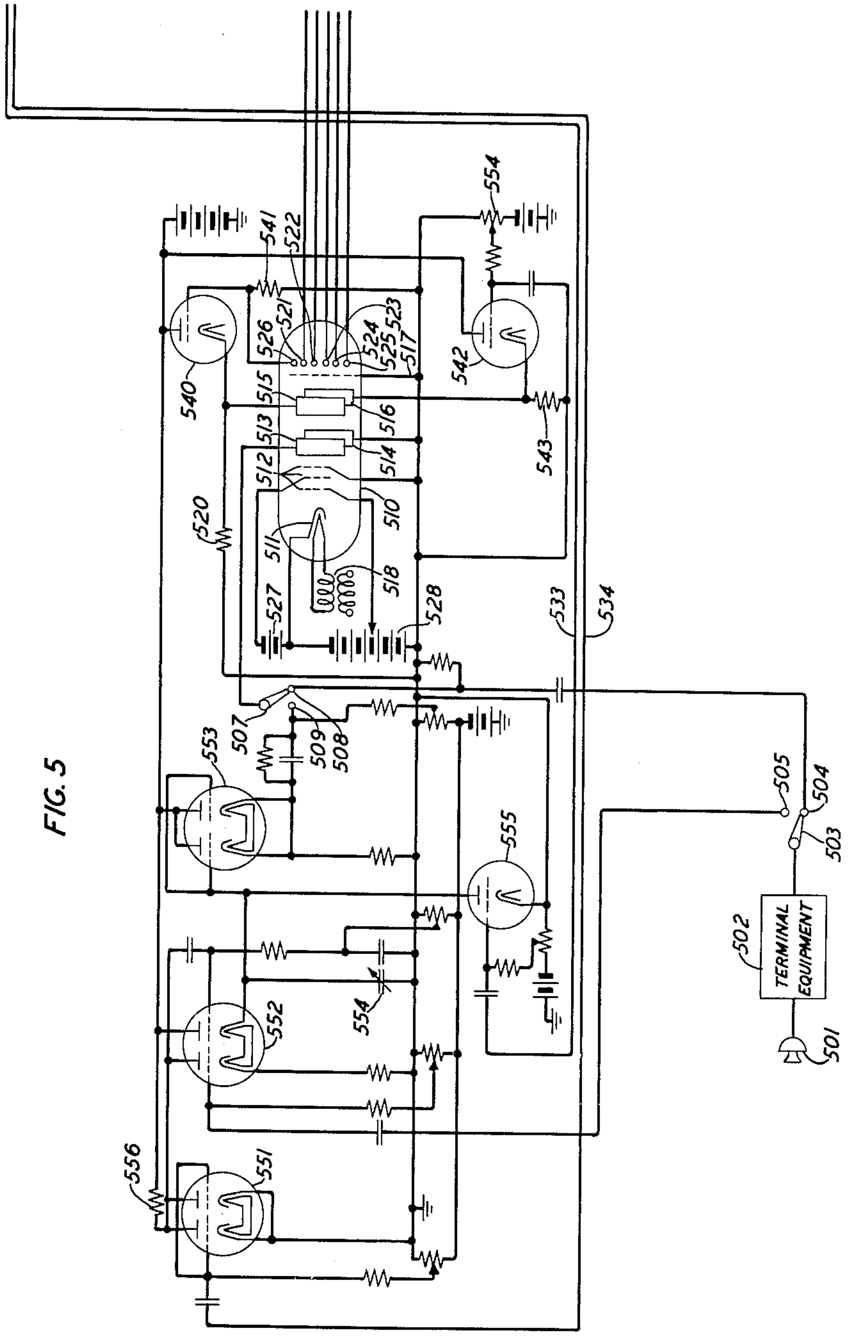
Figure 14:
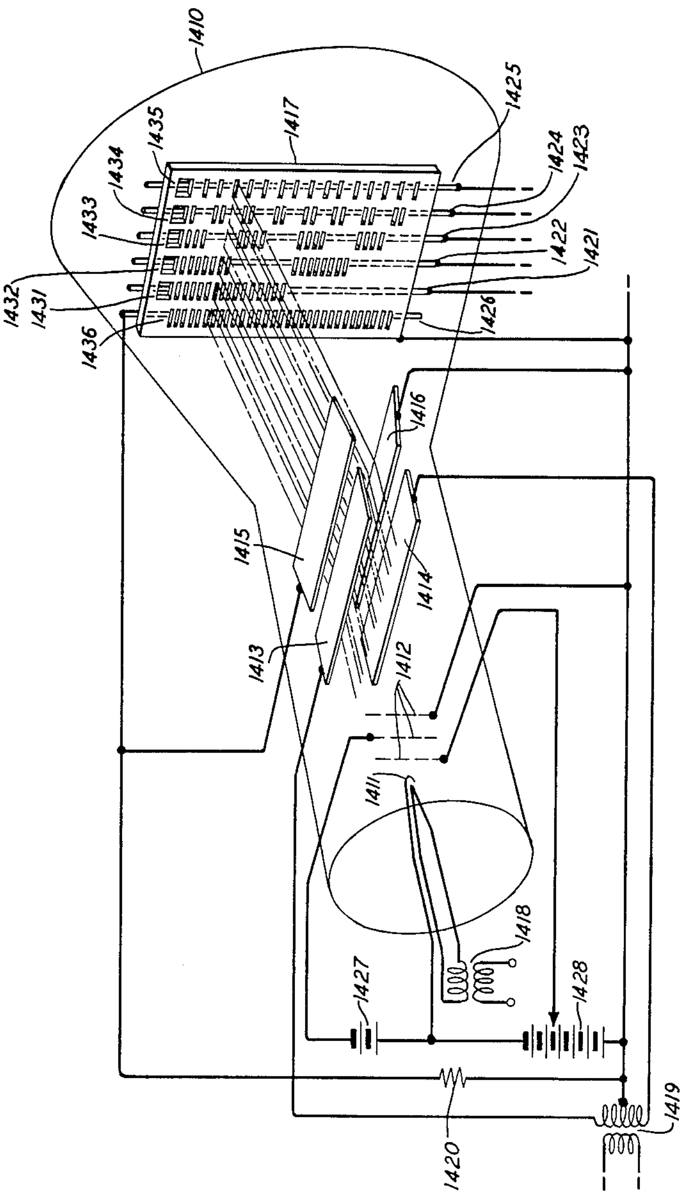
Fig. 14 shows a perspective of an exemplary cathode-ray tube embodying the present invention which is suitable for use as a coding device at the transmitting station.

In the exemplary embodiment of the invention set forth herein a high speed coding tube is employed in coding apparatus 214. The tube is shown in Figs. 5 and 14. Referring first to Fig. 14, the tube comprises an evacuated envelope 1410 in the form of a cathode-ray tube which may be of metal, glass, or other suitable material including combinations of metal, glass and other suitable material employed in the construction of evacuated electron tubes and devices. The tube is provided with a source of electrons from the cathode 1411 which is heated by a heater supplied by suitable power through transformer 1418 in the usual manner. In addition, beam-forming elements 1412 are provided and then connected to suitable sources of accelerating and beam-forming potentials from sources 1428 and 1427 which sources are illustrated as batteries in Fig. 14, but may comprise rectifiers, filters, or other suitable power sources.

In the usual electron beam tube the beam-forming elements 1412 are arranged to form a small beam of electrons which is focused to a small spot on a target or screen. These beam-forming elements frequently comprise aperture plates and the like and are provided with suitable apertures to form a spot of small dimension.

In accordance with the present invention the beam-forming electrodes 1412 of any suitable number and construction are arranged to form a wide sheet or plane of electrons of very small thickness which likewise is focussed upon the target 1417. The beam-forming elements 1412 consequently will usually be provided with apertures in the form of slits instead of small holes as in the usual case. These beam-forming electrodes will nevertheless function analogous to cylindrical lenses to focus the beam of electrons in a very narrow line across a target 1417. The beam-forming members represent both electrostatic and electromagnetic focussing and beam-forming elements including electrodes, coils and related elements and apparatus. Also, the beam-forming and focussing may include a combination of both types of elements.

The target 1417 is provided with a plurality of series of apertures arranged in columns as shown in Fig. 14. These apertures are arranged to form the desired code which in the exemplary embodiment set forth herein is a five-element code arranged in accordance with a binary numbering system. It will be readily understood by persons skilled in the art that any number of code elements may be employed and they may be arranged in any desired manner to form the code employed for transmitting the signals as will be described hereinafter. In addition, an auxiliary column of apertures 1436 is provided in the plate or target 1417 and employed to shift the beam so that it will not rest between the apertures forming in code as will be described hereinafter. The source of signals to be coded and transmitted is supplied through the transformer 1419 to the deflecting plates 1413 and 1414. These deflecting plates in addition to having the signals to be transmitted applied to them are connected to the proper biasing potential so that they do not interfere with or aid in the focussing of the electrons in a narrow line upon the target 1417. Deflecting plates 1413 and 1414 deflect the beam vertically in accordance with the magnitude of the signals received through the transformer 1419. As a result the vertical position of the line of electrons across the target plate 1417 is controlled by the magnitude of the applied signals.

Certain portions of this electron beam pass through the apertures in plate 1417 and fall upon or are collected by the collecting elements 1421 through 1426, inclusive, positioned behind the various columns of apertures in the aperture target plate 1417. The electrons in falling upon these collecting elements or anodes change their potential as is well understood. It is thus apparent that the potentials of these elements 1421 through 1425, inclusive, at all times represent the magnitude of the incoming signals applied through the transformer 1419 to the deflecting plates 1413 and 1414. As shown in Fig. 14 the input to the deflecting means is balanced to ground while in Fig. 5 the input to the deflecting means is not balanced with respect to ground. Either arrangement may be employed. In other words, the output from elements 1421 through 1425 of the tube at all times is a complete binary code representing the instantaneous amplitude of the applied signal or other complex wave form to be transmitted, which in the typical case could be a speech wave form. When desired the beam may be deflected in a vertical direction under control of signals to be coded by magnetic deflecting coils and related apparatus or by a combination of both magnetic and electrostatic means in place of the means shown in the drawing.

In order to prevent the beam of electrons from remaining between any two rows of apertures representing two different amplitudes and thus either causing no potential on the output leads or causing potentials in accordance with two different codes to be applied to the output leads, and in order to reduce the time required to shift the electron beam from one row of apertures to the next, an additional set of apertures is provided in the target plate 1417 and an additional collecting element or electrode 1426 is provided behind these apertures. The auxiliary apertures as illustrated in column 1436 are provided between the rows of coded apertures in columns 1431 through 1435, inclusive. Thus, if the beam of electrons tends to fall between two of the rows of coded apertures in response to the applied signals, a portion of the electrons will pass through one of these auxiliary apertures and cause the collecting element or anode 1426 to become more negative due to the electrons received by it. This element is connected to one of an auxiliary set of deflecting plates 1415. As a result the deflecting plate 1415 will become more negative and tend to move the beam downward so that it will no longer rest between two rows of coding apertures. Instead, the beam or the major portion thereof will pass through apertures of the next lower row. If, however, the signal changes sufficiently then the beam will move up to the next row when the signal overcomes the depressing effect of the potential applied to the auxiliary deflecting elements 1415 and 1416. The auxiliary apertures, collecting element and the auxiliary deflecting element of the tube described above are frequently called quantizing elements because they tend to cause the beam to occupy the discrete positions on the target plate 1417 and thus tend to represent the magnitude of the incoming signal by any one of a plurality of different discrete codes representing a particular discrete amplitude of the incoming signal. In other words, the incoming signal as represented by the code output from the tube is not a continuous function but one having any one of a plurality of separate and distinct amplitudes.

It is of course apparent that the feedback connection from the auxiliary element 1426 may be made to the signal deflection plates, if only one set of vertical (as shown in the drawing) deflection plates is provided in the tube. When desired the feedback connection may be made to the auxiliary deflecting plates such as 1415 and 1416 which may include any suitable types of amplifier equipment to secure the desired amount of control of the electron beam to insure that the beam always passes through some one row of code apertures in the target plate 1417.

As shown in the drawing the target plate 1417 extends some distance below the last row of apertures so that so-called blank code will be transmitted when the beam is directed to its lowermost position by the received signals. If the beam should be moved still lower than the normal range of the tube, the same code will still be transmitted because the beam will not pass through any apertures, will not impinge upon any of the collecting elements, but will be completely intercepted by the target plate 1417.

Likewise, if the beam is directed by a signal having a greater amplitude than its normal operating range of the tube above the row associated with the uppermost apertures of the plate, the same code will still be transmitted because as shown in the drawing the upper apertures of each of the columns 1431 through 1435 inclusive have been extended an appreciable distance above the normal position of the last row of code apertures in the plate. Consequently, if the signals should at any time have amplitudes which would temporarily exceed the range coding tube the codes representing the maximum or minimum amplitude would continue to be transmitted instead of some other code. In this manner the noise distortion introduced by overloading the coding tube is greatly reduced or eliminated.

When desired, other or additional apertures in the target or aperture plate may be elongated or extended by a greater or lesser amount as may be desired. These additional or other elongated apertures may be positioned near the center of the plate to effect noise impression or they may be placed at other immediate positions for other special purposes including clipping, compression expansion, etc.

When desired, the apertures may be made to become progressively larger or progressively smaller as the amplitude of the applied signaling wave is increased. In the first case the applied wave form is compressed so that a larger signal amplitude may be represented by a given number of codes. In the second case a complex wave form is expanded.

The apertures in the aperture or target plate are described herein as being arranged in rows of columns in which the apertures in any row represent a code group of signals.

It is evident that by rotating the tube or the aperture plate and electron gun structure through 90 degrees the rows become columns and the columns rows so that the rows and columns may be interchanged.

In the exemplary embodiment set forth herein an aperture plate is provided in combination with collecting electrodes behind the apertures. It is evident that an equivalent group of properly shaped and proportioned collecting electrodes can be employed when desired.

It is also assumed herein that when the electrons of the electron beam pass through apertures in the aperture plate and fall upon the collecting electrodes behind these apertures they will cause a potential of the collecting electrodes to be reduced.

However, when desired, the collecting electrodes may be designed and arranged to operate as secondary emitters in which case they become more positive when the electron beam passes through an aperture and falls upon these collecting electrodes because each electron from the electron beam will cause a plurality of electrons to be dislodged from the collecting electrode thus leaving it more positive.

Thus, by providing a sheet of electrons which focus the line upon the target plate, a code representing any of the plurality of different discrete amplitudes of the applied signal is always complete and instantaneously available for transmission. It is unnecessary to move the beam across the apertures as in coding tubes in the prior art.

The coding tube is also represented in Fig. 5 by tube 510 in a more schematic form so that the manner in which it is incorporated in transmitting and code modulation circuits may be more readily understood. Here the cathode is represented by 511 which is heated with power from transformer 518 or in any other suitable manner so that it will emit electrons. These electrons are formed and focussed into a sheet or plane of electrons which impinge upon the aperture target 517. This target is represented by the dotted line in Fig. 5, but actually has a form as shown by the target plate 1417 in Fig. 14. The collecting electrodes or anodes behind the target are represented at 521 through 526 in Fig. 5. Here the incoming signals are applied to the deflecting plates 513 and 514. Feedback path from the quantizing collecting element 526 is connected through vacuum tube 540 to the quantizing deflecting plate 515. The other quantizing deflecting plate 516 is connected to tube 542. The tubes 540 and 542 are shown as cathode follower tubes. Tube 540 is employed to respond to a small number of electrons falling upon the collecting element 526 which cause a small drop across the resistor 541. The tube 540 thereupon causes a much larger current to flow through the cathode resistor 529 and accurately control the potential of the deflecting plate 515. In other words, the cathode follower tube is employed as a current amplifier or impedance changing device which has a high impedance input circuit and thus readily responds to a small number of electrons collected by the collecting elements 526. Nevertheless it accurately controls the potential of deflecting plate 515 which may have appreciable capacity and thus a lower impedance.

It is to be understood of course that tube 540 represents an amplifier which may include more than a single-stage cathode follower tube as shown in the drawing.

Tube 542 is similarly connected to the other correcting deflecting plate 516. Tube 542, however, has its grid connected to the voltage divider 544. The divider 544 may be adjusted for the purpose of centering or properly adjusting the position of the electron beam in tube 510. In addition tube 542 also tends to compensate for changes in battery potential of the various supply sources employed in the system. Thus, for example, if the anode batteries of the tubes 540 and 542 change, a corresponding change is applied to both quantizing plates 515 and 516 so that this change in battery potential is largely balanced out and does not cause improper operation of the coding tube and does not in effect add noise or other spurious currents to the coding apparatus which currents might otherwise appear as noise in the decoded signals. Novel features of this coding tube disclosed but not claimed herein are claimed in my copending application Serial No. 37,035 filed July 3, 1948, now United States Patent 2,616,060, granted October 28, 1952.

Figure 15:
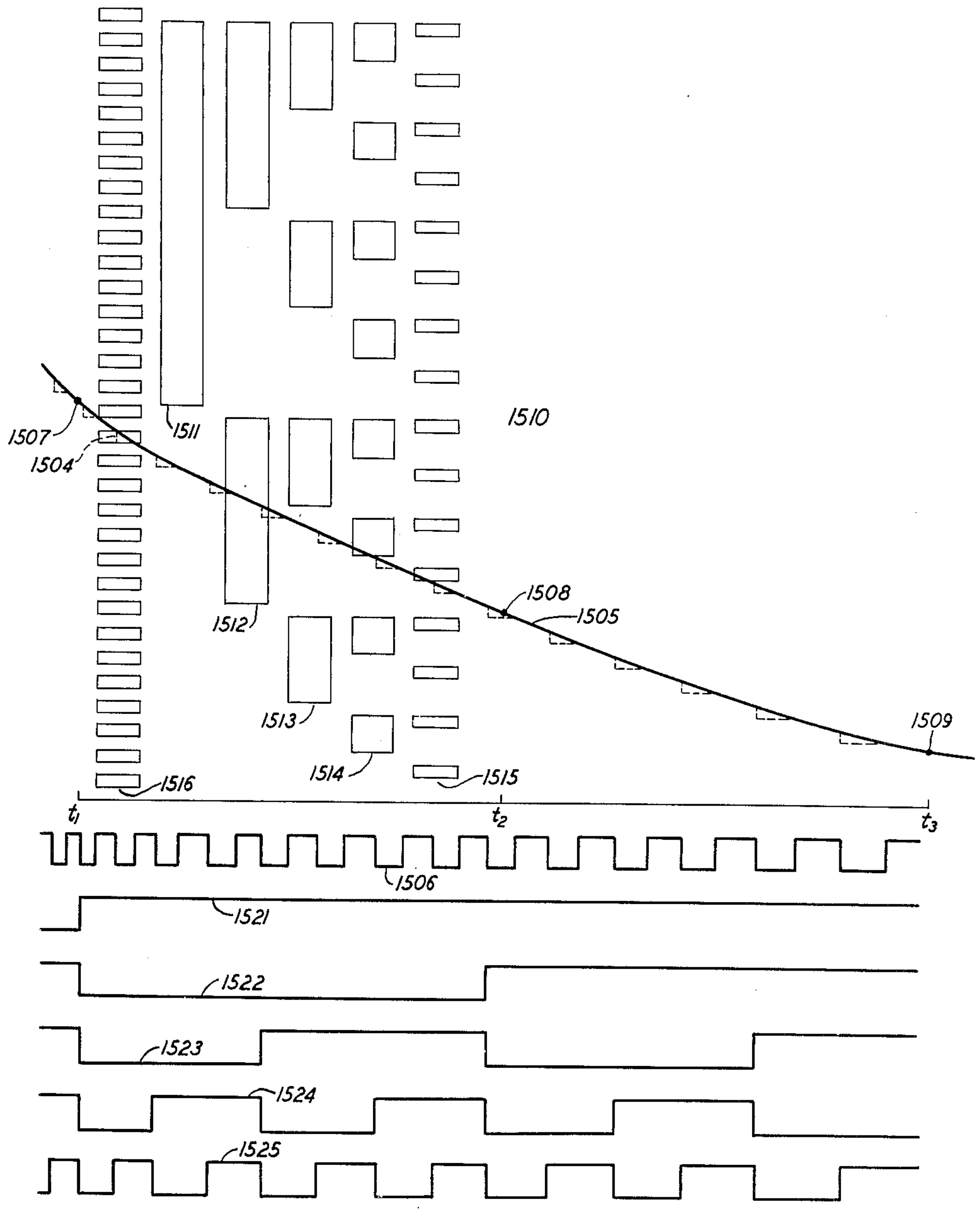

The above-described operation of the coding tube 510 is illustrated by the graphs in Fig. 15. 1510 shows a portion of the target similar to 1417 of the coding tube. This target is provided with a plurality of apertures arranged in six vertical columns 1515, 1514, 1513, 1512, 1511 and 1516. The vertical column 1511 comprises the apertures which control the digit in the first digital position or digit of highest denominal order of a corresponding binary number; likewise, column 1512 comprises the apertures which control the second digit of the number and so on. The vertical column 1516 represents the apertures for providing auxiliary control of the electron beam within the tube.

It is assumed, for purposes of illustration, that the applied wave has a wave form such as illustrated by graph 1505 in Fig. 15. This graph has been superimposed upon the apertures of the target in such a way that it is assumed that at any time *t* along the X axis the electron beam will be at a height on the target shown by the position of the graph 1505 at that time. Thus, assuming that at time *t1* the beam will be at position 1507, at a later time *t2* the beam will be at a position 1508 and at a still later time *t3* the beam will be at a position 1509. When the beam is in position 1507 it passes through only the one aperture in column 1511 thus indicating an amplitude of sixteen for the complex wave form at the time *t1*. The graph 1521 illustrates the potential on the collecting electrode 521 at this time and since the beam passes through an aperture in columns 1431 and 1511 it impinges upon this electrode. The electrode will be at its more negative potential as illustrated for time *t1* by graph 1521. The beam will not pass through any other apertures in front of any of the other coding electrodes 522 through 525. Consequently these electrodes will be at their more positive potential at time *t1* as illustrated by graphs 1522, 1523, 1524 and 1525. At a slightly later interval of time the beam will be depressed due to the applied voltage illustrated by graph 1507 and will pass through an aperture in column 1516 which will cause current to flow and change the potential of the collector electrode 526 which will cause the beam to be immediately further deflected as illustrated by the dotted line 1504. Thus, the beam will then pass through apertures in columns 1512 through 1515, inclusive, and will not pass through an aperture in column 1511; as a result the potential of the collecting electrode 521 rises to a more positive value as illustrated by graph 1521 while the remaining coding electrodes 522 through 525, inclusive, will assume a more negative potential value due to the fact that electrons from the beam pass through apertures in front of these collecting electrodes and reduce their potentials. The voltages of these other electrodes at this time are represented by graphs 1522 through 1525. At each succeeding instant of time, the electron beam is deflected as indicated by graph 1505 and will pass through various ones of the apertures in the various columns. At time *t2*, for example, without the quantizing control apertures 1436 and 1516 the beam will be between the rows of apertures representing amplitudes of seven and eight. At this time *t2* the beam will pass through the aperture in column 1516 and thus cause the collecting electrode 524 to assume a more negative potential which in turn will depress the beam so that it will pass through the apertures representing an amplitude of seven. As a result the voltage of the electrodes 513, 514 and 515 will be negative and the voltages of all of the other collecting electrodes are at their more positive potential, as illustrated by graphs 1521 through 1525 at the time *t2*.

It is thus evident that at any time *t*, the potential on the output electrodes represents in coded form the displacement of the electron beam and thus the magnitude of the complex wave form applied to the system described herein.

As will be described hereinafter the approximate times *t1*, *t2* and *t3* have been selected as the times at which pulses representing the amplitude of the complex wave form are to be transmitted over the multiplex system.

As shown in the drawings, a monitoring circuit 220 is provided at the transmitting station. This monitoring circuit enables the attendant to observe the operation of the coding circuits to determine if they are operating properly. The monitoring circuit may comprise receiving multiplex and pulse code modulation decoding equipment. This monitoring circuit may comprise substantially all of the apparatus at the receiving station as described hereinafter. The monitoring circuit operates in the manner well understood in the art or in accordance with the receiving equipment and circuits described herein. Consequently, there is no need to repeat the description of the operation of this equipment at this time.

A detailed operation of an exemplary system embodying the present invention may be more readily understood with reference to Figs. 4 to 13, inclusive, and arranged adjacent one another as shown in Fig. 1.

*Common equipment*

In order to better understand the operation of the system the common equipment shown on the top of Figs. 2 and 3 in diagrammatic form will be described first.

Figure 4:
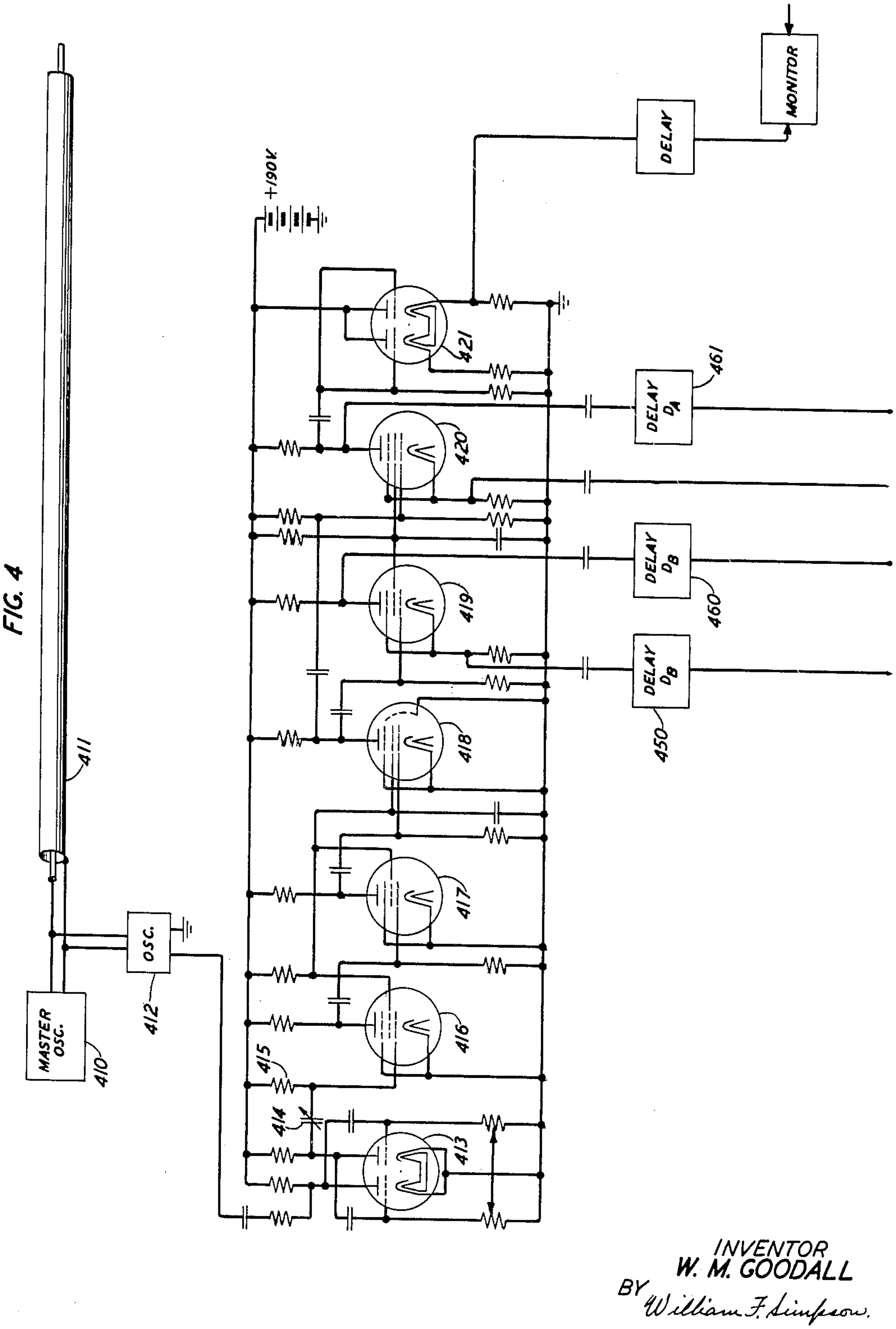

Fig. 4 illustrates a master oscillator 410 and the secondary oscillator 412. If the master oscillator 410 is located at the transmitting station the details of which are illustrated in Fig. 2 and Figs. 4 to 9 inclusive, local oscillator 412 may be dispensed with. However, in case the master oscillator 410 is located at some other station or is a master frequency standard for a large number of stations, systems, or for the entire country, both oscillator 410 and the local oscillator 412 will usually be employed. Master oscillator 410 may be of any suitable type such as the type disclosed in the above-identified Meacham or Morrison patents. The local oscillator 412 will then incorporate control apparatus for maintaining its frequency in synchronism with the frequency from the master oscillator 410 similar to the equipment described in detail in the above-identified patents. Oscillator 412 is connected over a synchronizing line 411 which is shown in Fig. 4 as a coaxial line and extends to receiving station shown in Figs. 10 through 13, inclusive. The coaxial line 411 terminates at the receiving station in a local oscillator 1012 which is similar to the oscillator 412. While the synchronizing line 411 is shown as a coaxial line, it is to be understood that any suitable type of transmission path may be employed which is capable of transmitting the synchronizing frequency employed.

*Synchronous pulse generator*

The local oscillator 412 or the master oscillator 410 is connected to a multivibrator circuit comprising tube 413. The multivibrator circuit 413 operates to generate square waves which usually have the same frequency as received from oscillator 412 or 410; however, the frequency of operation of multivibrator 413 may be different from the frequency of the controlling oscillator. In addition the frequencies of operation of the oscillators 410, 412 and 1012 will usually be the same but may be different when desired. Multivibrator circuits are well known in the art. Typical multivibrator circuits for use in the present system are described in United States Patents 1,744,935 granted to Van der Pol January 28, 1930, and 2,022,969 granted to Meacham on December 3, 1935, and in an article by Hull and Clapp published in the Proceedings of the Institute of Radio Engineers for February 1929, pages 257 to 271. See also section 4–9 "Multivibrator" on page 182 of Ultra-High-Frequency Techniques by Brainerd, Koehler, Reich and Woodruff. The output of the multivibrator 413 is coupled through a condenser 414 and a resistance 415 to amplifier tube 416.

Condenser 414 is made variable so that it, together with resistance 415 may be employed to control the length of the synchronizing pulses derived from multivibrator circuit 413. If the time constant of condenser 414 and resistance 415 is large the output pulse will be relatively long, whereas if the time constant of condenser 414 and resistance 415 is small the output pulse will be short. In a typical example of the present system the values of condenser 414 and resistance 415 were selected to produce an output pulse of approximately two microseconds duration.

Figure 6:
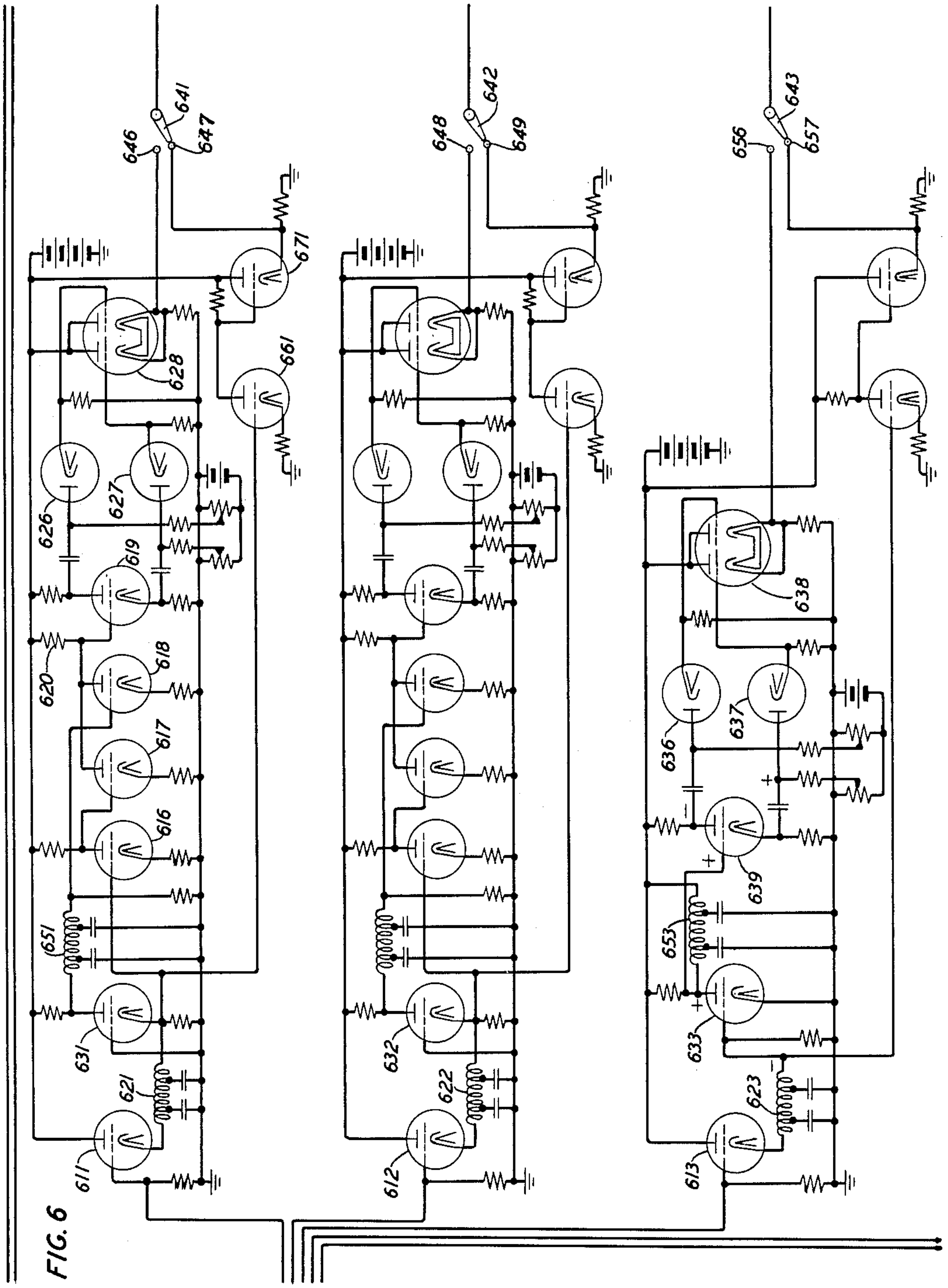
Figure 7:
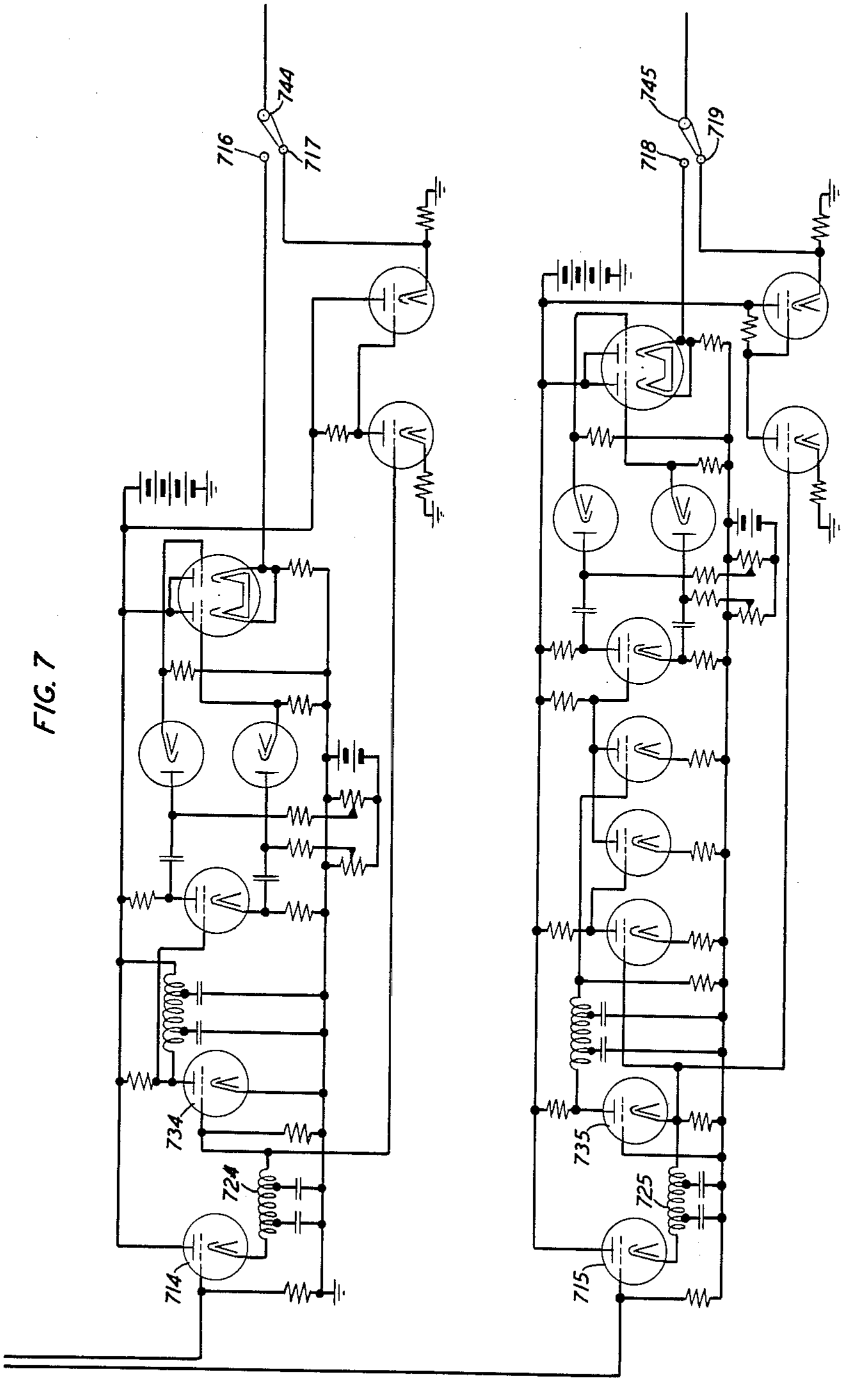
Figure 8:
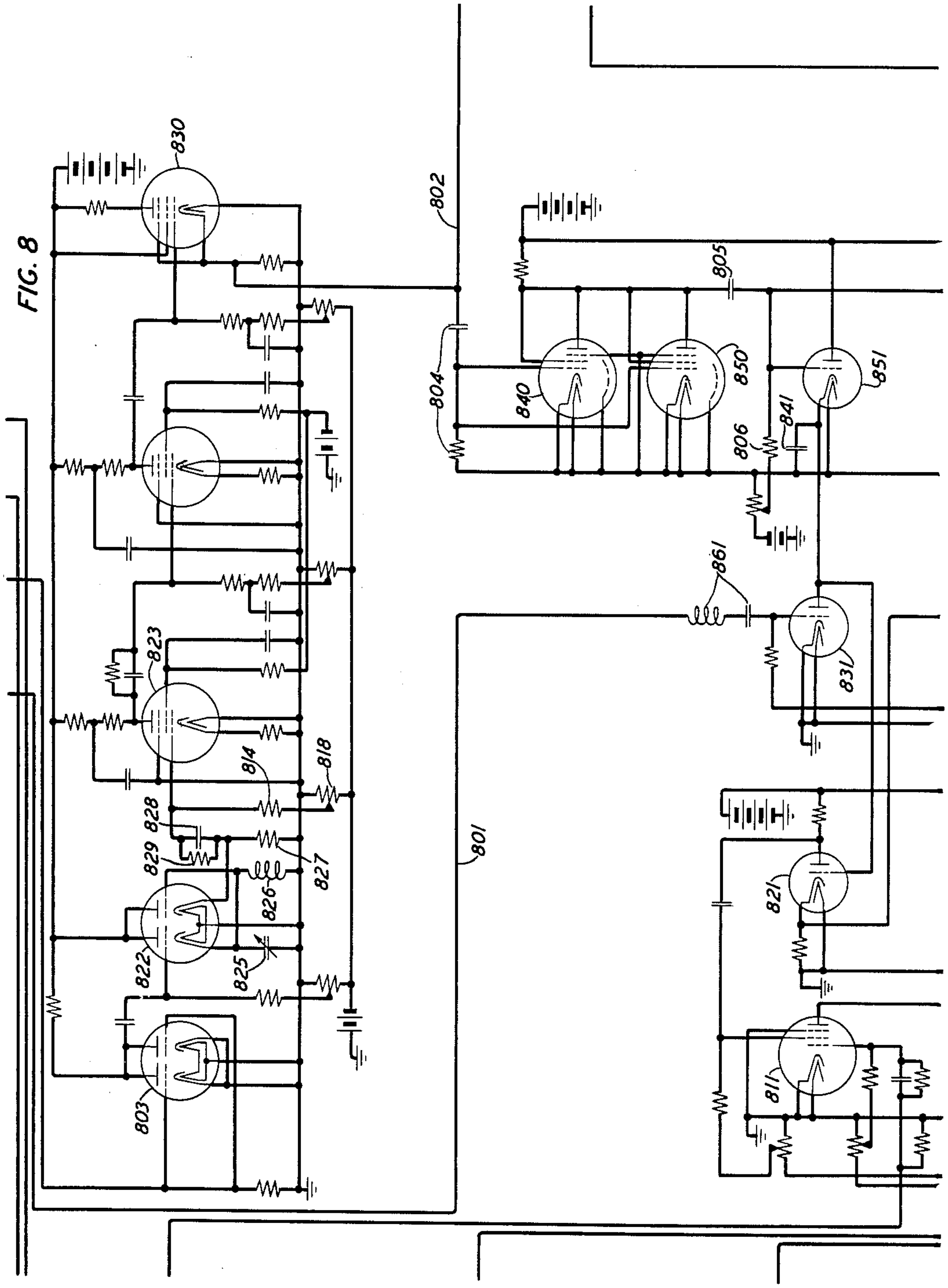

Condenser 414 and resistance 415 are coupled to the control grid of amplifier tube 416. The output of the amplifier tube 416 is in turn coupled to tubes 417, 418, 419, 420 and 421. Tubes 416, 417 and 418 are amplifier tubes which are overloaded by the magnitude of the pulse applied to them so that these tubes tend to limit the magnitude of the pulse repeated through them and at the same time tend to make it square in wave shape. Amplifiers of this type are sometimes called "limiters" and at other times "clipping" amplifiers because they limit, clip off or suppress the top portion of the waves applied to them. A single stage "limiter" is shown in Fig. 8–6 on page 282 and described on page 283 of Ultra-High-Frequency Techniques by Brainerd, Koehler, Reich and Woodruff. First published July 1942 by D. Van Nostrand Company, Incorporated.

The output of tube 418 is coupled to tubes 419, 420, and tube 421 is coupled to tube 420, which tubes are employed to prevent improper interaction between the various utilization circuits and to supply sufficient power for the output pulses of the circuit so that they may be employed to control the other circuits of the system. The output circuit of tube 419 is arranged to supply both positive and negative pulses. Negative pulses are obtained from the plate of tube 419, while positive pulses are obtained from its cathode as shown in Fig. 4.

In case a large number of circuits are supplied from pulse generator shown in Fig. 5, additional output stages may be connected in parallel with tube 419, i. e., may have their input circuits connected in parallel with the input circuit of tube 419, or may be driven from this tube as is well understood and frequently employed.

The negative pulses from the plate of tube 419 pass through a delay network 460 where they are delayed slightly in time with respect to the synchronous pulses. The purpose of this delay will be explained hereinafter. Delay network 460 will be of any suitable type employing reactive elements in a manner well understood in the art and pointed out above. The undelayed output of the pulse generator shown in Fig. 4 is diagrammatically indicated by the lines 1601 of Fig. 16 for the positive pulses. The negative output pulses of course will occur at substantially the same time. Under the assumed condition the synchronous pulse generator circuit generates pulses at the rate of 10,000 per second so the pulses occur at intervals of about 100 microseconds.

*Code element timing circuit*

The output from the anode of tube 419 is connected through the delay device 460 to code element timing circuit comprising tubes 803, 822, 823, 824 and 830. The tube 803 is employed to drive the left-hand section of tube 822 which tube in turn is employed to shock-excite the resonant circuit comprising condenser 825 and inductance 826 connected in parallel in the cathode circuit of the left-hand section of tube 822. The bias conditions applied to the left-hand section of tube 822 are such that the tube is blocked or non-conducting at all times except when the positive pulse from tube 803 is applied to its grid. At these times the left-hand section of tube 822 forms a low impedance path for supplying current and energy to the oscillating circuit connected in its cathode circuit. At all other times the anode-cathode circuit of tube 822 is of such a high impedance that it does not materially affect the oscillations of the resonant circuit comprising elements 825 and 826. The application of a positive pulse to the grid of tube 822 thus sets the resonant circuit described above into oscillation. The wave form of such oscillations is shown by curve 1602 in Fig. 16.

As shown by curve 1602, one suitable type of adjustment for the resonant circuit is such that substantially five complete oscillations take place between the delayed positive synchronizing pulses 1603 applied to the grid of the left-hand section of tube 822.

In other words, one cycle or oscillation is generated between the synchronizing pulse for each code pulse of each group of code pulses. If six or some other number of pulses are required to represent the various amplitudes of each sample of the complex wave then the tuning of the resonant circuit comprising condenser 825 and inductance 826 would be varied to generate six or the required number of cycles or oscillations between synchronizing pulses.

As shown by curve 1602 slightly more than five complete oscillations of the resonant circuit take place but the synchronizing pulse causes the circuit to start oscillating from substantially the same point and with the same phase each time it is received. By supplying energy to the oscillating circuit when the current through the coil is small and by utilizing the low impedance of the cathode circuit, transients are small and quickly damped out. Transients do not, therefore, materially affect the frequency or amplitude of the oscillations and at the same time the oscillations are maintained in proper phase.

The cathode of the left-hand section of tube 822 is connected to the grid of the right-hand section of this tube. The output impedance of the right-hand section comprises a cathode resistor 827 which is of such a value that the right-hand section of tube 822 acts as a so-called "cathode follower" and thus presents an extremely high impedance to the resonant circuit comprising elements 825 and 826. Consequently, the operation of the right-hand section of tube 822 does not materially alter or interfere with the operation of the resonant circuit. Such properties and operation of "cathode followers" are well known to persons skilled in the art. (See "The cathode follower" by C. E. Lockhart, Parts I, II and III, published in Electronic Engineering, December 1942, February 1943, and June 1943, respectively.)

The cathode of the right-hand section of tube 822 is coupled through a resistance and capacity network to the grid of tube 823. Capacity 828 and resistance 829 are employed in the coupling circuit in order to properly control the wave shape of the pulses transmitted to and repeated by the tube 823. Resistances 814 and 829 together with the position of potentiometer 818 control or determine the bias of the grid of tube 823. Condenser 828 is connected across resistance 829 to compensate for the effect of the input capacitance of tube 823, thus causing the potential of the grid of tube 823 to rise substantially as fast as the applied potential, i. e., the potential of the cathode of the right-hand section of tube 822. The optimum value of condenser 828 is the value of the input capacitance of tube 822 multiplied by the ratio of resistance 829 to resistance 827. It should be noted that the potentiometer 818 is connected between the negative source of bias potential or battery and ground.

The output of tube 823 is similarly connected to tube 824 and the output of this tube in turn, connected to tube 830. Tubes 823 and 824 are adjusted to operate as overload amplifiers so that they will limit the amplitude of the output pulse and at the same time cause these pulses to approach a square wave form. Tube 830 is a power tube for supplying sufficient output power to operate the other circuits as will be described hereinafter. In this case as in the case of the output of the pulse generator, sufficient additional output tubes may be provided in parallel with or supplied by tube 824 to provide the necessary output currents and voltages as well as to isolate the various different circuits one from another, as may be required.

The amplifier tubes 822, 823 and 824 have their circuits and bias potentials so adjusted that a wave form approaching that illustrated by curve or broken line 1604 appears in the output from the tube 824. Both the positive and negative portions of this wave form as shown in the drawing are substantially of the same duration. Persons skilled in the art will at once realize that it is not necessary that both of these portions of the wave be of equal or substantially equal duration but may and usually will be of different duration to secure optimum operation. Furthermore, these waves are shown to be rectangular in form, as are other waves in the drawing. In practice, the waves are rounded to a greater or lesser extent. Inasmuch as typical actual wave forms approach the wave forms shown in the drawing and would not further aid in an appreciable manner the understanding of this invention the actual waves are represented by the forms shown in the drawing which are much easier to draw and adequately represent the operation of the system.

*Continuous coding*

Assume for purposes of illustration that the various switches shown in the drawing are operated to the positions shown.

When the switches are so operated, the exemplary system set forth herein is arranged to respond to and transmit complex wave forms such as voice frequency waves including speech, music and the like or any other suitable types of complex wave forms having frequency components having frequencies within the same frequency range. Such other wave forms may represent telegraph signals, picture currents and so forth. The complex wave is then translated into code groups of signals which signals are employed to generate pulses representing the instantaneous amplitude of the complex waves at each of a plurality of rapidly recurring instants of time. These pulses are then transmitted over a transmission system which may take the form of a radio path including the highest radio frequencies which when transmitted exhibit many properties of light beams. The transmission path may also include coaxial cables, wave guides, and other suitable transmission circuits, apparatus, and media, capable of transmitting the necessary and desired frequency range.

The signals as received at the receiving terminal are then decoded and a wave form similar to the original complex wave form will be constructed and transmitted to terminal equipment.

Fig. 5 shows a signal source 501 which corresponds to source 210 of Fig. 2. As shown in Fig. 5, source 501 is represented by a microphone. However, any suitable type of signal source may be employed including telegraph and picture apparatus.

The source 501 is connected to the terminal equipment 502 which terminal equipment may and usually will include one or more of the following types of equipment such as transmission paths, manual or automatic switching equipment, toll lines, carrier current circuits, radio circuits, amplifiers, gain regulators, coaxial lines, wave guides, repeaters, interconnecting equipment and the like.

This equipment operates in its usual manner as is well understood in the prior art so that details of its operation need not be repeated here. This equipment is employed to extend the transmission or communication path from source 501 to the exemplary transmission system described herein in detail embodying the present invention.

From the terminal equipment 502, the signals are transmitted through switch 503 to terminal 504 when switch 503 is operated to positions shown in the drawing. The signals are then transmitted through switch 507 from terminal 508 to the deflecting plate 513 of the coding tube 510. As a result the electron beam in this tube is caused to move in a vertical direction under control of received signals. Due to the action of the quantizing column apertures 526, quantizing deflecting plates 515 and 516 as well as the repeater represented by tube 540, the beam is moved in discrete steps so electrons of the beam fall upon the collecting elements 521 through 525, inclusive. The particular ones of these elements upon which the electrons fall are determined in part by the apertures or codes in the plate 517 and also by the magnitude of the received signals.

As a result, as pointed out hereinbefore, the elements 521 through 525, inclusive, have at substantially all times potentials applied to them which represent the amplitude of a complex wave form by means of a chosen code.

As shown in Figs. 5 and 14, the coding tube is arranged to represent the instantaneous amplitudes of complex wave forms by means of a five-element binary code. It is to be understood, however, that any other type of binary code or other type of code may be employed. The greater the number of elements of the code employed the greater the number of discrete amplitudes of the incoming signal which may be represented by the code.

The aperture plate 517 of the tube may be formed as shown by the aperture plate 1417 in which the codes representing binary numbers are employed to represent a various successive amplitude of a complex signal wave. Any other suitable code may be employed such as the code disclosed in the patent application of Gray, Serial No. 785,697, filed November 13, 1947.

As shown in the exemplary embodiment set forth herein, the five output leads are connected to a synchronously operated multiplex distributing and transmission system. It is, of course, well understood that the output from each of these leads may be transmitted over a separate communication path extending to the receiving station and there employed to regenerate a complex wave form similar to that received from the terminal equipment 502. However, by means of time division multiplex systems the output of each one of these leads or terminals may be transmitted in sequence over a time division multiplex system at rapidly recurring instants of time. As is well understood, the recurrence rate should be somewhat greater than twice the highest frequency component of the signals received from the terminal equipment 502 which is necessary or desired to transmit to the distant terminal of the system.

Figure 9:
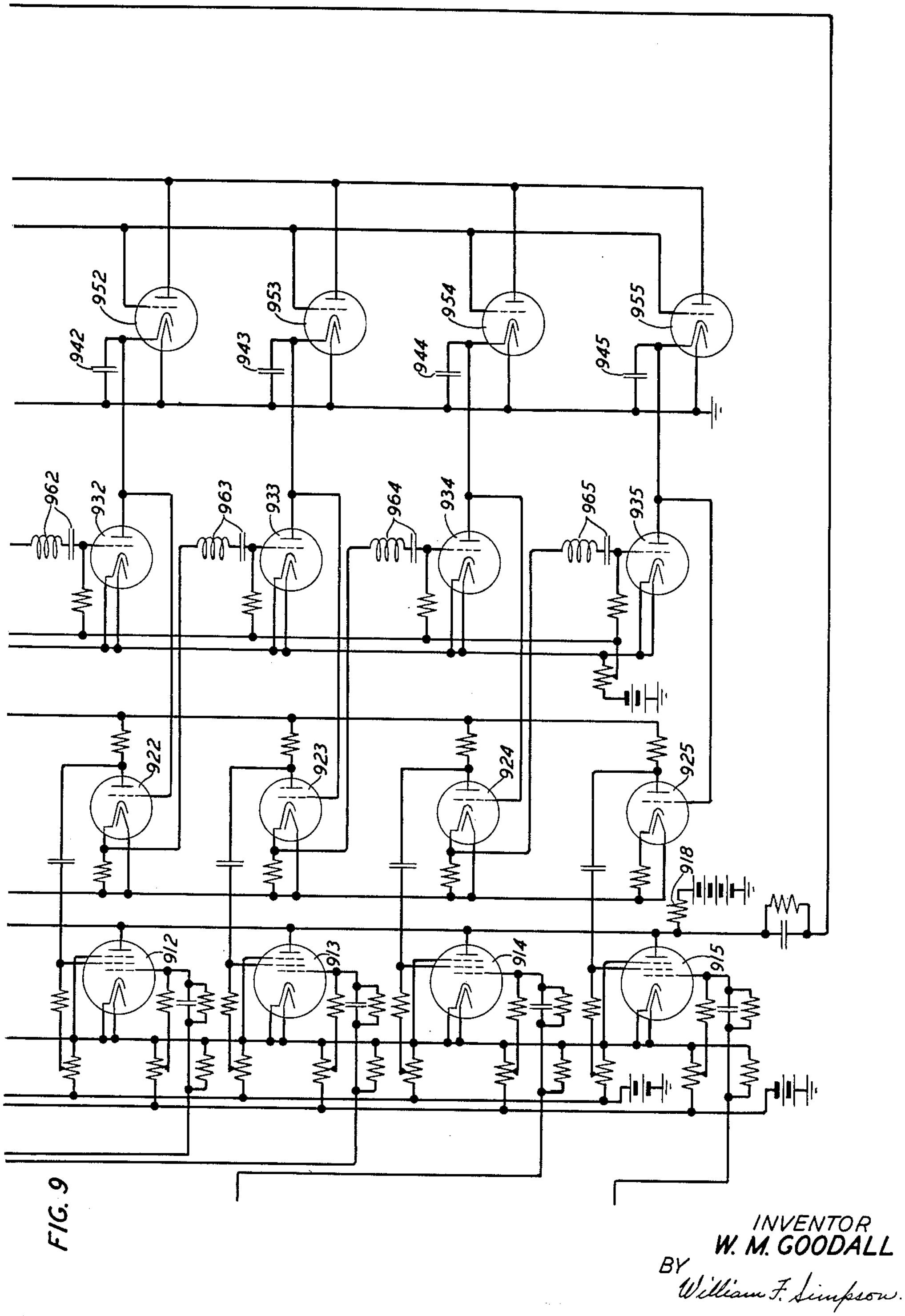

The transmitting multiplex equipment which successively transmits signals representing the output from each of the code element electrodes of tube 510 is shown in the lower half of Fig. 8 and in Fig. 9. Each row of tubes starting with tubes 811, 821, 831 and 851 of these figures is employed to transmit signals from one of the code element electrodes such as 521. The next row of tubes 912, 922, 932 and 952 is employed to transmit signals from another one of the electrodes such as 522 of tube 510, for example.

Figure 16:
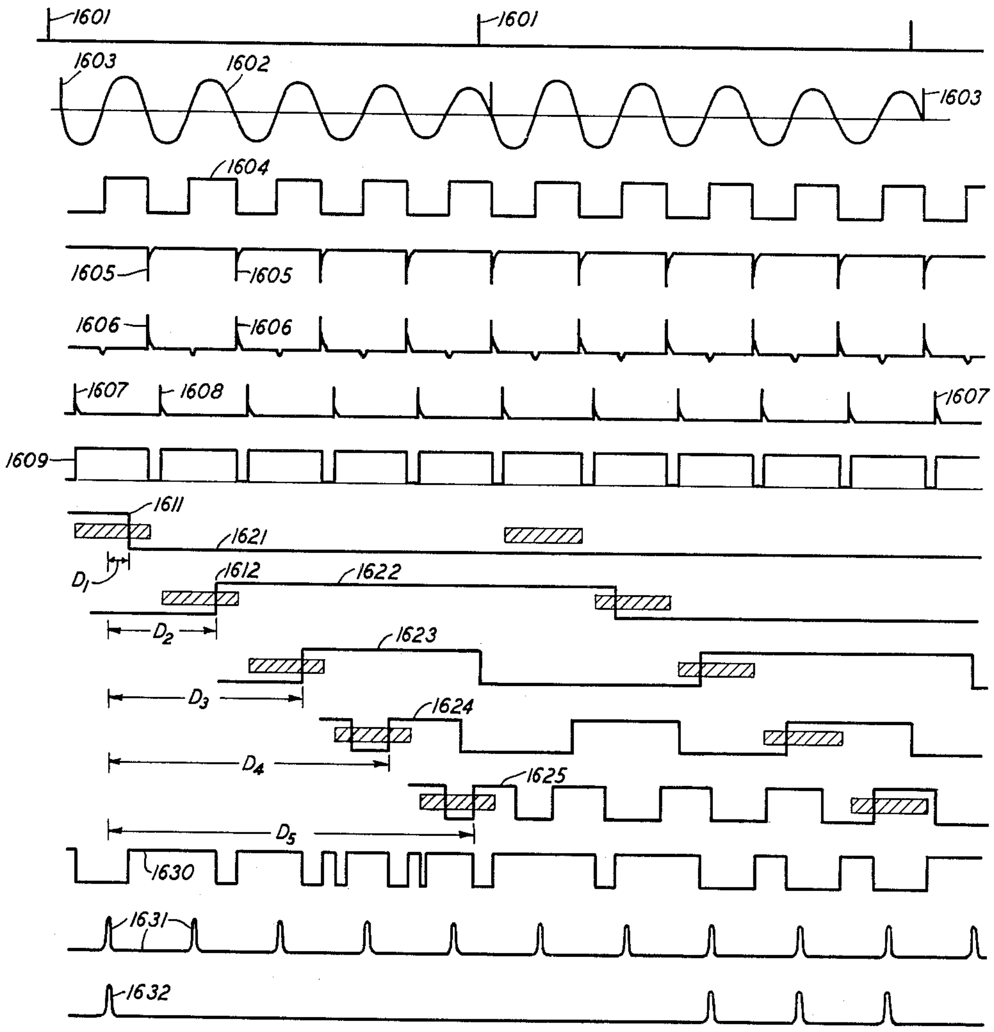

The distributor equipment shown in Figs. 8 and 9 is driven by pulses from the synchronous pulse generator shown in Fig. 4 and pulses from the code element time generator equipment shown in the upper portion of Fig. 8. A positive pulse is applied to lead 801 from the synchronous generator in Fig. 5 for each complete code combination. A negative pulse is obtained from lead 802 for each of the code elements of a complete code combination. Thus when the system is arranged to transmit five-element binary permutation code signals five negative pulses are obtained from lead 802 from tube 830 for each pulse received from the synchronous pulse generating equipment over lead 801. These negative pulses are obtained by the condenser-resistance combination 804 which has a low or short time constant so that the square wave is in effect differentiated and a negative pulse applied to the grids of tubes 940 and 950 each time the square wave 1604 changes from a positive value to a more negative value. The positive pulses obtained when the square wave changes in the other direction are largely suppressed by the bias conditions applied to tubes 840 and 850. The negative pulses are represented by lines 1605 and the corresponding positive pulses obtained from tubes 840 and 950 are represented by lines 1606. Furthermore, as shown in Fig. 16 the first negative pulse obtained from lead 802 is slightly in advance of the time a delayed positive pulse is applied to lead 801. The negative pulses applied to the grids of tubes 840 and 850 are repeated by these tubes 840 and 850 operating in parallel, as a positive pulse which pulse is applied to a control element of each of the tubes 851, 952, 953, 954 and 955. Tubes 851, 952 through 955, inclusive, operate as cathode follower tubes and cause the condensers individual to their cathode circuits 841, 942, 943, 944, 945 to become charged during the application of the positive pulse to control elements of the respective tubes. Each of these condensers becomes charged to substantially the same voltage which is a function of or substantially equivalent to the voltage or magnitude of the positive pulse applied to the control elements of tubes 851, 952 through 955, inclusive.

As pointed out above, the positive pulse is applied to lead 801 after the negative pulses obtained from lead 802 have terminated. The exact times at which these pulses are applied to these leads may be controlled by delay times of the delay devices 450 and 460. The pulses applied to lead 801 from the synchronous pulse generator shown in Fig. 4 are transmitted through delay device 450 and thus the delay introduced by the device controls the exact time of application of the pulses to lead 801. Pulses applied to the code element timing circuit shown in the upper portion of Fig. 8 are transmitted through the delay device 460; thus by adjusting the delay of this device the exact timing of the pulses obtained from lead 802 may be controlled.

The pulses as applied to lead 801 are delayed in time as well as in effect differentiated by the inductance and condenser circuit 861. As shown by lines 1607 these synchronizing pulses are delayed by this combination so that the grid of tube 831 will be positive after the short positive pulses 1606 applied to the grids of tubes 851, 952 through 955, inclusive, have terminated. The pulses applied to the control elements of the above tubes as its wave form may be controlled by the condenser-resistance network 804 and by condenser 805 and the resistance 806. These networks have a short time constant. That is, the product of resistance and capacity of these networks is small so that they in effect differentiate or transmit only a very short pulse through them upon the application of a pulse or square wave to them from the previous circuit.

The application of a positive pulse to the control element of tube 831 after positive pulse applied to control element of tube 851 is terminated causes the upper terminal of condenser 841 to become discharged. The upper terminal of condenser 841 is connected to the control element of tube 821. Likewise, upper terminals of condensers 942 through 945, inclusive, are connected to the control elements of the respective tubes 922 through 925, inclusive. Thus, after the application of a positive potential to the control element of tube 831 the control element of tube 821 has a relatively low voltage applied to it whereas the corresponding control elements of tubes 922, 923, 924 and 925 have a relatively high positive voltage applied to them from the corresponding condensers 942, 943, 944 and 945. The anode circuits of tubes 821 and 922 through 925, inclusive, are coupled to one of the control elements frequently called the screen or screen grid, of tubes 811, 912 through 915, inclusive. These tubes are biased and are arranged so that they will pass substantially no anode current unless the screens of these tubes are at a relatively high positive potential. The coupling condensers between the anodes of the respective tubes 821 or 922 through 925 and the screens of tubes 811, 912 through 915, inclusive, as well as the screen resistors have a relatively long time constant; that is, the product of their capacity and resistance is relatively large compared to the duration of the signals. As a result the voltage or potential of the screen of tubes 811, 912 through 915 follows the potential of the anodes of the respective tubes 821, 923 through 925. When a positive voltage is applied to the control elements of tubes 923 through 925, inclusive, substantial current flows in the anode-cathode circuit of these tubes and produces a large voltage drop across the anode resistance with the result that relatively low voltage is applied to the screens of tubes 912 through 915, inclusive. Under these circumstances a bias voltage applied to the other elements of the tubes 912 through 915 is such that substantially no current will flow in their output circuits independently of the potential applied to other of the control grids such as the inner grid frequently called the control grid. However, inasmuch as a relatively low voltage is applied to the control element of tube 821 substantially no or much less current flows in the anode-cathode circuit of this tube with the result that this anode is a relatively high positive voltage. Consequently, voltage of the screen grid of tube 811 is at a sufficiently high positive voltage so that current may flow in the anode-cathode circuit of this tube depending upon the voltage of the inner or No. 1 grid.

The application of the next pulse from the output circuits of tubes 840 and 850 to the control grids of tubes 851 and 952 through 955, inclusive, causes condenser 841 to be charged. In addition, condensers 942 through 945 are again charged to the full positive potential as controlled by the magnitude of pulses applied to the control grids of the corresponding tubes. In the case of condensers 942 through 945, however, the charge supplied to these condensers at this time compensates for loss due to leakage currents because the condensers are not otherwise discharged.

Upon the application of positive potential to the upper terminal of condenser 841 at this time current again starts to flow through the anode-cathode circuit of tube 821 thus causing the voltage at the anode of this tube to fall to a relatively low value which in turn causes the screen of tube 811 to have its voltage reduced so that current can no longer flow in the anode-cathode circuit of tube 811, independently of the voltage of the control grid of this tube. That is, even though the control grid is positive, substantially no current flows in the output circuit of tube 811 at this time. The anode-cathode current of tube 821 flows through the cathode resistor of this tube as well as the anode resistor with the result that upon the initiation of a discharge through the tube 821 due to the charging of condenser 841, as described above, the voltage or potential of the cathode of tube 821 is increased.

The cathode of tube 821 is coupled through the coupling network 962 comprising an inductance and condenser to a control element of tube 932. This network is similar to the network 961 and causes a delayed pulse of short duration represented at 1608 of Fig. 45 to be applied to the control element of tube 932. This delayed pulse 1608 does not terminate until after the positive pulse applied to the control elements of tubes 851 and 952 through 955, inclusive, is terminated. As a result the upper terminal of condenser 942 will be discharged by current flowing through tube 932. At this time tube 922 will cause a voltage applied to the screen grid of tube 912 to increase so that current may now flow in the anode-cathode circuit of tube 913 under the control of the voltage applied to other control elements of tube 912. At this time, however, the other condensers 841, 943 through 945 are substantially fully charged so that the screen grids of tubes 811 and 913 through 915, inclusive, are at a low voltage with the result that these tubes are unable to pass current in their anode-cathode circuits even though the control grid of these tubes becomes as positive as that of tube 912 which tube will conduct current if its control grid has a positive signaling voltage applied to it at this time.

The circuits then stay in the above-described condition until another pulse is repeated by tubes 840 and 850 at which time the screen of tube 912 again becomes more negative and the voltage applied to the screen of tube 913 becomes sufficiently positive so that this tube will conduct anode-cathode current under control of another grid or control element thereof.

The times during which the tubes 811 and 912 through 915 are conditioned to conduct by having the voltage of their screen grids raised to the proper positive value is illustrated by graph 1609. The line 1611 shows the time tube 811 is conditioned to conduct, the line 1612 shows the time tube 912 is conditioned to conduct, etc.

It is thus evident that the tubes 811, 912, 913, 914 and 915 are conditioned one after another in sequence to conduct current in their anode-cathode circuits under control of voltage applied to some other control element which is the control grid. It is also apparent that only one of these tubes may conduct current in any one given instant of time.

Each of the code element electrodes or collectors 521 through 525 of tube 510 controls the voltage applied to the control grid of the respective tubes 811, 912 through 915, inclusive. The path from each of the collector electrodes of tube 511 to the corresponding distributor gate tube includes repeating tubes and a delay network. For example, electrode 521 is connected to the control element of the repeating tube 611. Tube 611 is shown as a cathode follower type of tube and is intended to represent a generalized amplifier which may include voltage gain as well as the impedance transforming properties of the cathode follower tubes actually shown. The cathode follower tube 611 is connected to the delay line 621 and the output of the delay line is connected to the input circuit of the repeating and amplifying tube 661. The output of tube 661 is connected to the input circuit or element of the cathode follower tube 671. The output of tube 671 is connected through switch 641 when it engages the terminal 647 as shown in the drawing to the control grid of tube 811 through suitable coupling network. The coupling network in this case includes a direct-current path and is arranged so that the voltage of the control grid of tube 811 has at all times substantially the same wave form as the wave form of the voltage at the output terminal of the delay line 621 and at the output of tube 671.

The collecting code element or electrode 522 of tube 510 is similarly connected through repeating tube 612, delay line 622, tubes 622 and 672 and switch 642 to a control grid of tube 912. Likewise, each of the succeeding output elements of tube 510 is connected through similar repeating, delay, and switching apparatus to a control grid or element of the succeeding distributor tubes of Fig. 9.

The code elements or electrodes 511 through 515, as shown in the drawing, control the voltage or potential of the respective multiplex distributor gate tubes 811, 912, 913, 914 and 915. These connections have been so shown so that the operation of the system may be more readily understood. When desired, the various code electrodes or elements of the coding tube 510 may be connected to control the various multiplex distributor gate tubes in any order or disorder that may be desired. Of course, the connections at the receiving gate tubes would have to be changed in a corresponding manner.

As described above the potentials applied to the code elements 521 through 525 of tube 510 change substantially simultaneously in response to the changes in amplitude of the applied signal wave. However, the distributor tubes 811 and 912 through 915 are energized successively as described above so that pulses representing the potential conditions on the code elements 521 to 525, inclusive, are sent in succession.

In order to prevent pulses which are transmitted from tubes 811 and 912 through 915, inclusive, from representing different code groups of pulses due to the fact that the potentials on the code elements 521 through 525 change during the time tubes 811, 912 through 915 are transmitting a series of pulse delay lines 621, 622, 623, 724 and 725 are connected between the respective code element electrodes 521 through 525 and tubes 811 and 912 through 915. The delay of the delay device 621 is provided to permit such initial delay as may be desired and compensate for other delays which may be encountered in the system. The delay device 622 is arranged to provide a delay equal to the delay of delay device 621 plus the time interval between transmitted pulses, that is, the time interval between the energization of successive tubes 811, 912, 913, etc. The delay device 623 is provided with the delay equal to the delay of delay line 621 plus twice the interval between transmitted pulses. Similarly, delay device 724 is provided with a delay time equal to the delay of the delay line 621 plus three times the interval between pulses. Delay device 725 is provided with a delay substantially equal to the delay of delay device 621 plus the time between the transmission of four successive pulses.

The delay devices 621, 622, 623, 724, and 725 may be of any suitable type such as transmission lines or sections, artificial lines or sections, electronic delay devices such as, for example, the type disclosed in United States Patent 2,245,364 granted to Reisz et al. on June 10, 1941, or they may be of the type employing supersonic waves such as disclosed in United States Patents 1,775,775 granted to Nyquist September 16, 1930, and 2,263,902 granted to Percival November 25, 1941. The disclosures of all of the above-identified patents are hereby made a part of the present application as if fully set forth herein.

These delay lines may also be of the type described in an article entitled "Video delay lines" by Blewett and Rubel published in the Proceedings of the Institute of Radio Engineers for December 1947, vol. 35, No. 12, page 1580 through page 1584. The disclosure of the above-identified article is also hereby incorporated herein by reference to the same extent as if fully set forth.

Inasmuch as these delay devices are operated in the usual manner in cooperating with the other elements of the patented system and inasmuch as the operation of all such devices is understood in the prior art, their operation will not be described in further detail herein.

By providing these delay lines or devices with delay intervals such as described above, the series of pulses transmitted by the respective tubes 811 and 912 through 915 represent the potential conditions simultaneously applied to the code element electrodes 521 through 525, inclusive. Thus, except for the infrequent case wherein the potentials on code elements 521 through 525 change at substantially the exact time that these potentials will be applied in succession to the distributor tubes 811, 912, 913, etc., the delay networks change the pulses or voltage conditions simultaneously applied to the electrodes 521 through 525 into a series of voltage conditions occurring in sequence and applied to the control grids of other control elements of tubes 811 and 912 through 915, inclusive.

The output of anodes of the distributor tubes 811, 912, 913, 914 and 915 are all connected together and provided with a common anode resistor or impedance 918.

When current flows in the output circuit of any one of the distributor tubes 811 and 912 through 915, inclusive, current also flows through the common output impedance 918 and produces a voltage drop across this impedance. This voltage drop is applied as a negative pulse to the control element of tube 1120 thus causing the cathode of this tube and the cathode of tube 1121 to become more negative. The control element of tube 1121 is coupled through the coupling network comprising condenser 1124 and resistor 1125 to the output of the code element timing circuit which is a wave form substantially as illustrated by graph 1604. The time constant of this coupling network is short so that the wave form illustrated by graph 1604 from the code element timing circuit is in effect differentiated when applied to the grid of tube 1121. The bias applied to the control element of tube 1121 through resistor 1125 is such that the tube is normally nonconducting. When the output wave form in the code element timing circuit changes from its more positive value to its more negative value a negative pulse is applied to the control element of tube 1121. This negative pulse, however, merely tends to further cut the tube off and inasmuch as it is biased beyond cut-off this negative pulse produces substantially no effect.

However, when the output from the code element beam circuits changes from its more negative value to its more positive value a positive pulse is applied through coupling condenser 1124 and allows tube 1121 to conduct under control of the potential applied to the control element of tube 1120. A pulse of short duration only is applied to the control element of tube 1121 due to the short time constant of condenser 1124 and the biasing resistor 1125. If the control element of tube 1120 is negative at this time due to a negative pulse received from one of the distributor tubes 811 or 912 through 915 current will flow in the output circuit of tube 1121 at this time. The negative pulse flows in the output circuit of this tube which pulse is amplified and repeated as a positive pulse by tube 1122. Tube 1123 acts as an output tube and causes a positive pulse to be applied to the radio transmitter 1106 and antenna 1107.

If, however, the voltage applied to the control element of tube 1120 is more positive at the time positive pulse is applied to the control element of tube 1121 in the manner described above substantially no current flows in the output circuit of this tube. Consequently, the pulse of opposite character, that is, a spacing pulse, or a pulse of no current, is transmitted to the radio transmitting equipment for transmission to the distant receiver.

The above-described operation of the transmission of the pulses to the radio system under the assumed conditions is illustrated by the graphs in Figs. 15 and 16.

As described above, the potential of the coding element 521 at tube 510 is illustrated by graph 1521 and is negative at the time $t1$ because the beam passes through an aperture in front of the code element 521 allowing electrons to fall upon the electrode 521. This negative potential condition is repeated in tube 611 as a negative voltage which is transmitted down the delay line 621 and then repeated by tube 661 as a positive pulse. The tube 671 then repeats the positive pulse and applies it to the control element of tube 811 causing this tube to conduct current when it is rendered active. This in turn causes a negative potential in the output of the distributor which potential is then repeated as a positiev pulse to the radio circuits by tubes 1120, 1121, 1122 and 1123 in the manner described above. Graph 1621 illustrates the potential applied to the control element of tube 811. This graph is similar to the graph 1521 except that it is inverted and delayed due to the delay introduced by the delay device 611. The shaded portion 1611 represents the time that the screen grid of tube 811 is rendered positive so that this tube will conduct and cause a negative voltage in the output circuit as illustrated by graph 1630. Graph 1631 represents the negative voltage applied to the control element of tube 1121 which in turn causes a positive pulse represented by graph 1632 to be applied to the radio transmitter. Graph 1622 represents the voltage applied to the control element of tube 912 which is similar to graph 1522 except that it has been delayed by an amount of the delay in graph 1621 plus an amount equal to the time assigned to one pulse interval, that is, the time one step of the multiplex distributing equipment. Graph 1622 is likewise reversed in phase due to the operation of the repeating tube 662 similar to the operation of tube 661 as described above. Likewise, the rectangle 1612 represents the time at which the screen of tube 912 is rendered positive so that the tube is conditioned to conduct at this time. However, inasmuch as the cotnrol grid of tube 912 is more negative now current flows in the output circuit of this tube and as a result, a negative pulse is not applied to the control element of tube 1120 so no positive pulse, i. e., no marking pulse, is transmitted to the radio transmitter at this time. Each of the succeeding graphs 1623, 1624 and 1625 is delayed by a greater delay interval so that the potential applied to the control grid of the respective distributor tubes 913 through 915 as well as that applied to tubes 811 and 912 as described above at the time a positive pulse 1631 is applied to the control element of tube 1121 is controlled by or is a function of the potentials on the output electrodes 621 through 525 of the coding tube at the time $t1$. Thus, the pulses transmitted to the radio system as illustrated by graph 1632 represents the potential conditions of the electrodes 521 through 525 at the time $t1$ even though the various pulses are transmitted at progressively greater time intervals after time $t1$.

A second series of pulses corresponding to time $t2$ is also shown in the right-hand portion of the graphs of Fig. 16. The operation of the circuits is substantially as described above. It is noted that the potential conditions applied to the control elements of the gate tubes 811 and 912 through 915 may change time during the time tubes rendered active by a positive voltage applied to their screens in the manner described above. However, so long as the voltage is not changed at the time pulses 1631 are applied to the control element of tube 1121 proper signals are transmitted as illustrated in the graphs.

By making the pulses 1631 applied to the control grid of tube 1121 of short duration the probability of the potentials applied to the control grids of tubes 811 and 912 and 915 changing at the time the pulses 1631 are applied to the control element of tube 1121 is greatly reduced.

*Sampling the applied signaling wave*

If it is desired to prevent the potential conditions from the code element electrodes of tube 510 from changing at a time such that the codes representing the instantaneous amplitudes will be mutilated, that is, several potential conditions transmitted first in one code and then the successive pulses controlled by the potential conditions of a subsequent code, sampling circuits, storing circuits, clamping circuits and the like or combinations of these circuits may be employed, either connected between the electrodes 521 through 525 of tube 510 and tubes 611, 612, 713, 814 and 815 or similar circuits and elements may be connected ahead of the signal control and deflecting plates 515 and 514 of tube 510.

Such an arrangement is shown in Fig. 5 and comprises tubes 551, 552, 553 and 555 together with the storage condenser 554.

When it is desired to employ this sampling equipment, switch 503 is operated to the position where it engages contact 505 as shown in the drawing. In addition switch 507 is operated to a position where it engages contact 509 instead of 508. Under these circumstances the incoming complex signaling wave is sampled at recurring intervals of time and a charge placed upon condenser 554 which is a function of the magnitude of the incoming signal wave at the time the wave is sent.

With the switches set in the condition described above, the complex wave from the source 501 is transmitted through the terminal equipment 502, switch 503, contact 505 and then to the control grid of the left-hand section of tube 552. The left-hand section of tube 552 has its anode connected in parallel with the anodes of tube 551 to the common anode resistor 556.

The sampling circuit receives two pulses from the synchronous pulse generator shown in Fig. 4. It receives a positive pulse over lead 533 and a delayed negative pulse over lead 534. The delayed pulse over lead 534 is delayed more than the pulse received over lead 533 so that positive pulse arrives over lead 533 first. The application of a positive pulse to lead 533 which is coupled to the control element of tube 555 causes tube 555 to conduct current. Normally, tube 555 is cut off and does not effect the potential or voltage of the upper terminal of condenser 554. However, upon the application of a positive pulse from lead 533 to the control element of tube 555 current flows in the anode-cathode circuit of tube 555 and discharges the upper terminal condenser 554.

Upon the termination of the positive pulse on conductor 533, and the application of a negative pulse on conductor 534, current flows in the anode-cathode circuit of tube 551. Normally, tube 551 is biased so that current flows in its output circuit. With tube 551 normally biased so that current flows in its anode-cathode circuit and thus through the anode-resistor 556, the voltage of the anodes of tube 551 and the anode of the left-hand section of tube 552 are maintained at a relatively low value with respect to ground. However, upon the application of the delayed negative pulse to the control elements of tube 551 from lead 534, current flowing through this tube is interrupted. As a result, the voltage of the plates of tube 551 and of the left-hand section of tube 552 rises to a value controlled by the voltage of the grid of the left-hand section of tube 552 and thus to a value controlled by the instantaneous amplitude of the incoming complex wave form applied to the control grid of the left-hand section of tube 552.

The anode of the left-hand section of tube 552 is coupled through a coupling condenser to the control element of the right-hand section of tube 552. This coupling condenser together with the associated bias resistor of the control element of the right-hand section of tube 552 is provided with a long time constant so that the voltage applied to the control grid of the right-hand section of tube 552 is similar in wave form or shape of the instantaneous voltage of the anode of the left-hand section of tube 552.

As a result, the grid of the right-hand section of tube 552 upon the application of the delayed pulse to conductor 534 rises to a more positive voltage which is a function of the instantaneous amplitude of the received complex wave form at this time. The cathode of the right-hand section of tube 552 tends to follow the potential of the control element of the right-hand section of this tube with the result that the upper terminal of condenser 554 is charged to a positive potential at this time which potential is a function of the instantaneous amplitude of the complex wave received from source 501 through the terminal equipment 502. Upon the termination of this delayed pulse, the right-hand section of tube 551 again starts to conduct current and causes the voltage of the anodes of right-hand section of tube 551 and the left-hand section of tube 552 to again fall to a low value which in turn causes the grid of the right-hand section to fall to a low voltage below the voltage of the cathode of this tube with the result that current ceases to flow in the anode-cathode path of this section. Consequently, the charge on the upper terminal of condenser 554 is maintained at substantially the value of the instantaneous amplitude of the complex wave at the time the negative pulse applied to conductor 534 terminates.

Tube 553 operates as a cathode follower tube and has its control element connected to the upper terminal of condenser 554. As is well understood in the prior art, cathode-follower tubes have a very high input impedance so that the input circuit of this tube will not materially change the voltage of the upper terminal of condenser 554. However, the cathode of tube 553 is maintained at a voltage which is a function of and very nearly equal to the voltage of the upper terminal of condenser 554. Thus, the voltage applied to the deflecting plates 513 and 514 of the cathode-ray tube remains substantially constant between the sampling intervals and remains at a value which is a function of the instantaneous amplitude of the applied complex wave at the time this wave was last sampled. The remaining portion of the transmission circuit operated as described above and causes pulses representing this amplitude to be transmitted in the manner described above. It is to be understood, of course, that the sampling time and thus the time of occurrence of the positive pulse applied to lead 533 and the delayed pulse applied to lead 534 is chosen, by adjustment of the delay device 461 and delay devices 621, 622, 623, 824 and 825 at such a time that the potentials of the code element electrodes 521 through 525, inclusive, of tube 510 remain constant and do not change at the time these potentials control the transmitted pulses.

Figure 18:
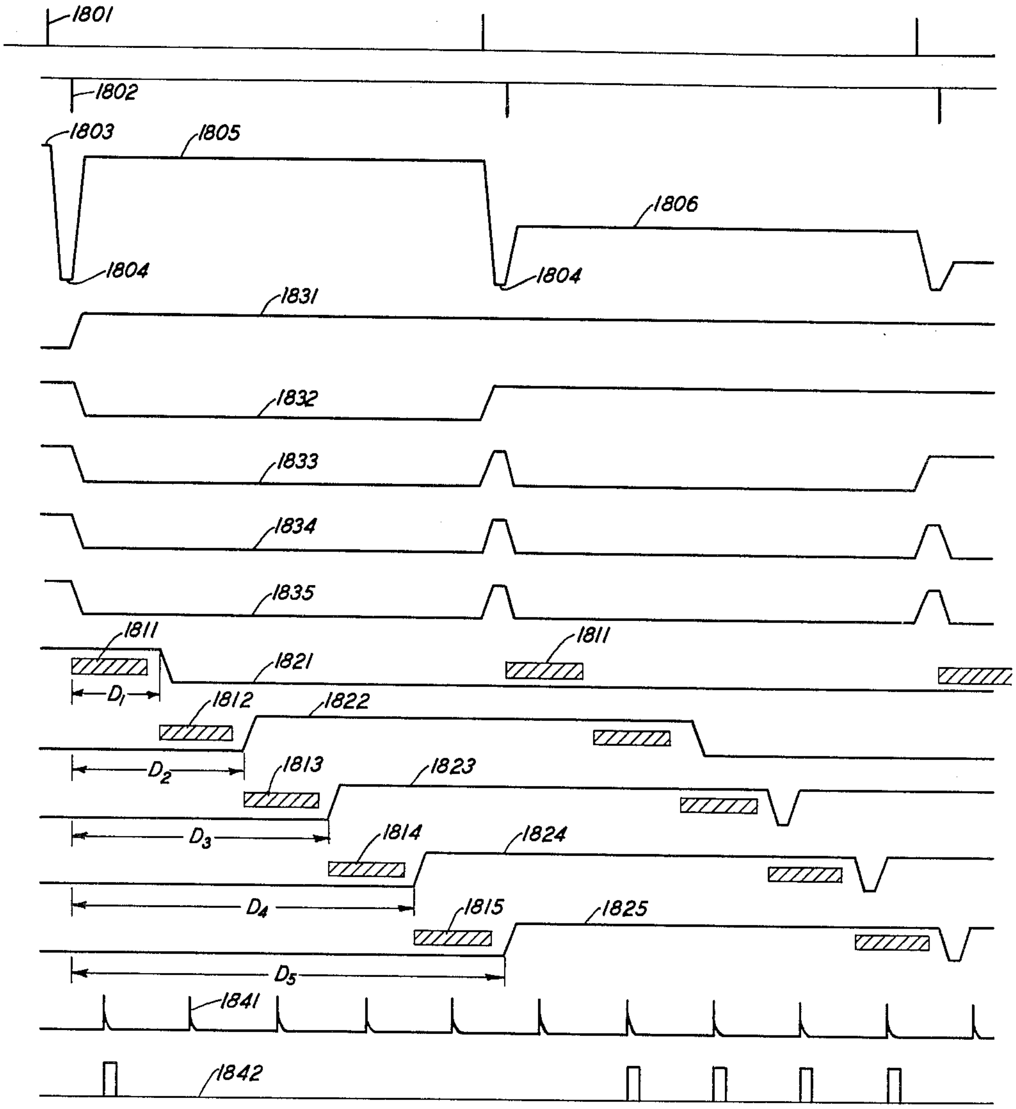

The above-described operation of the sampling circuits is further illustrated by the graphs of Fig. 18. The graph 1801 illustrates the undelayed positive synchronizing pulses from the cathode of tube 420. Graph 1802 illustrates the delayed synchronizing pulses from the anode of tube 420 after they have been transmitted through the delay device 461 and applied to the control elements of tube 551.

As described above when positive pulses are applied to the control element of tube 555 which are the undelayed pulses, they cause the storage condenser 554 to become discharged.

For purposes of illustration it has been assumed at the previous sampling time the storage condenser 554 was charged in response to a signal amplitude of 16 units. This charge is represented by the portion of the graph designated 1803. Upon the application of the undelayed pulse 1801 to the control element of tube 555, condenser 554 is discharged to a zero or reference value indicated by 1804 in Fig. 18.

Then upon the application of the delayed pulse such as represented by 1802, to the control grids tube 551, condenser 554 is charged under control of the amplitude of the applied signaling wave which, as shown in Fig. 15, has an amplitude of 15 units. This amplitude is represented by the portion of the graph designated 1805 in Fig. 18.

Upon the reception of the second undelayed synchronizing pulse condensers again then discharge to zero or reference value 1804 and upon the reception of the second delay synchronizing pulse 1802, condenser is recharged, this time to a value of 7 units because as shown in Fig. 15 the applied wave has the magnitude of 7 units of amplitude at the second sampling time $t2$.

The graphs 1831 to 1835, inclusive, show potential conditions of the output code electrodes or elements of the coding tube 510. Thus, under the assumed conditions, the graph 1831 represented the potential conditions on the output electrode 521 of the coding tube. Likewise graph 1832 represents the potential of the code element 522, etc.

Under the assumed conditions prior to the reception of the first undelayed synchronizing pulse 1801, the previous sample had an amplitude of 16. In other words, the electron beam passed through an aperture in the column 1431 of the tube and caused the corresponding electrode 521 to become more negative as shown in graph 1831. For an amplitude of 16, the beam does not pass through any of the other code apertures so that all of the other code elements or electrodes of the tube 510 are at a more positive value as illustrated by the graphs 1831 to 1833 prior to the reception of the synchronizing pulse 1801. After the delay synchronizing pulse has been applied to the system the sample stored on condenser 554 has been assumed to represent 15 units of amplitude. This time electron beam does not pass through an aperture in column 1431. It does pass through apertures in the remaining columns 1432 through 1435. As a result, the potential of the electrode 521 becomes more positive while the potentials of the remaining coding electrodes 522 through 525 assume their more negative value. Thereafter these potentials are maintained at these values until the second undelayed synchronizing pulse is applied to the sampling equipment of Fig. 5.

After the second delayed synchronizing pulse is applied, the condenser 554 is charged to a value representing 7 units of amplitude of the applied signal wave. Consequently, the beam will pass through apertures in columns 1823 through 1825, inclusive, but will not pass through apertures in columns 1421 and 1422. As a result, the electrodes 521, and 522 assume their more positive value while the remaining electrodes 523, 524 and 525 assume their more negative values until the third undelayed synchronizing pulse is applied as illustrated in Fig. 18.

As described above, the potentials of the output code element electrodes of tube 510 are employed to control the potentials applied to the control grids of tubes 811 and 912 through 915, inclusive. However, the potentials applied to these control grids are reversed or opposite to the potentials of the control electrodes of tube 510 and in addition are delayed by the respective delay networks 621, 622, 623, 824 and 825. As a result, the potentials applied to the control grids of the distributor gate tubes 811 and 912 through 915, inclusive, are illustrated by the graphs 1821 to 1825. In these graphs the various delays due to the respective delay lines enumerated above, are illustrated by the delay time D–1 through D–5, inclusive. A plurality of rectangles are drawn adjacent to graphs 1821 to 1825. These rectangles represent times during which the respective distributor gate tubes 811 and 912 through 915 are rendered active by having a sufficiently high positive voltage applied to their screen grids or other control elements. Thus, the rectangles 1811 represent the times during which the gate tube 811 may conduct current under control of the control grid thereof. Rectangle 1812 shows the times during which tube 912 may conduct current, etc.

The times during which the various respective graphs 1821 through 1825, inclusive, are positive when the respective distributor gate tubes are rendered active, the corresponding gate tubes conduct current as described above. Consequently, when the timing pulses 1841 are applied to the control element of tube 1121, positive pulses are transmitted to the radio equipment in the manner described above. These pulses are illustrated by graph 1842.

It is also evident that if the delay lines or the other delay devices 621, 622, 623, 824 and 825 are provided with longer delays, the significant time during which the potential on the code element 521 to 525 is employed to control the transmitted pulses may be shifted as desired. As shown in Fig. 18, the portions near the end of each sampling period are employed so that the various circuits may have ample time to assume their proper steady state conditions.

Also, the voltage of the control electrodes of the coding tube 510 cannot change during the time during which these potentials are employed to control the transmitted signals. Also the potentials of the output code element electrodes of tube 510 at predetermined and specific instants of time, which instants of time are the same and simultaneous for all of the code element electrodes, control the transmission of pulses in sequence.

As shown in the drawing, the signals are transmitted from radio antenna 1107 to the receiving antenna 1101. This radio path may be of any suitable frequency including the ultra-short wave or high frequency radio path wherein the radio waves exhibit many of the properties of light. The radio path and the antenna structures may include suitable reflectors, lenses and other related types of transmission equipment.

While the radio path is shown in the drawing, it is to be understood that any suitable type of transmission path or medium may be provided including coaxial lines, wave guides or other cable circuits capable of transmitting the desired frequency range. These paths may include any and all necessary or desirable repeater stations, amplifiers, transmission control equipment, and other auxiliary equipment useful in cooperating with the various types of transmission paths. The transmission path from the transmitting equipment 1104 to receiving equipment 1102 may be similar to the synchronizing path 411 or it may be of a different type as shown in the drawing or pointed out above or these paths may include any combination of the various types of paths when it is so desired.

Inasmuch as the transmission equipment of both the signals and the synchronizing equipment operate in their usual and well understood manner, detailed descriptions of representative types need not be repeated in the present application. It is understood, of course, that this equipment operates in its normal and usual manner in cooperating with the other elements of the exemplary system embodying the present invention.

*Receiving station*

Any suitable type of pulse code receiver may be employed to receive, decode, and reconstruct the signaling wave represented by the pulses transmitted as described above. Typical examples of such receivers are shown in United States Patents 2,449,467, granted to Goodall September 14, 1948; 2,438,908, granted to Goodall April 6, 1948, and 2,451,044 granted to Pierce October 12, 1948.

While the receiver may be in accordance with the disclosures of any of the above-identified patents or in accordance with other known pulse code receivers, an improved pulse code received is described hereinafter.

The radio waves from the transmitting antenna 1107 are received by the receiving antenna 1101 and then transmitted through the radio receiver 1102. The radio receiver 1102 generates pulses similar to those applied to the radio transmitter 1106 and applies these pulses to the adjustable delay device 1103. The delay device 1103 may be similar to any of the other delay devices described herein and is provided so that the time of transmission from the transmitting station to the receiving station may be adjusted so that the synchronizing equipment at the two stations may be common to a number of different paths between the two stations in question as well as common to paths between the receiving station and other stations when it is desired.

From the adjustable delay device 1103 the signals are applied to the control element of the amplifying tube 1105 which amplifies and shapes the received signals and repeats them to the cathodes of the receiving distributor tubes 1211, 1212, 1313, 1314 and 1315 which cathodes are connected in parallel.

Tubes 1211, 1212, 1313, 1314 and 1315 are part of a receiving time division multiplex distributor similar to the distributor described at the transmitting station. This distributor comprises five groups of tubes. The first group comprises tubes 1051, 1052, 1153, 1154 and 1155. This group of tubes is supplied by code element timing pulses from tubes 1040 and 1050. In the specific embodiment of this invention set forth herein, five tubes are provided in each group so that five code element timing pulses are supplied to tubes 1040 and 1050 for each complete code combination of pulses. These pulses are supplied from the code element timing generator shown in the upper portion of Fig. 10 which operates in the manner similar to the arrangement shown in the upper portion of Fig. 8. As in the case of the transmitting distributor tubes 1040 and 1050 receive negative pulses from the cathode circuit of tube 1210 and repeat these pulses as positive pulses in their common output circuits which positive pulses are applied to the code element of tubes 1051, 1052, 1153, 1154 and 1155. The above series of tubes 1051 through 1155 are normally biased so that no current flows in their anode-cathode circuits. However, upon the application of a positive pulse to the control elements of all of these tubes in parallel a positive voltage is applied to the left-hand terminal of the respective condensers 1041, 1042, 1143, 1144 and 1145. The magnitude of this voltage is a function of the magnitude of a positive pulse applied to the control elements of the respective tubes 1051 through 1155, inclusive.

At the termination of the positive pulse the tubes 1051, 1052, 1153, 1154 and 1155 all become non-conducting so that they do not further affect the voltage or charge on the left-hand terminals of the respective condensers 1041, 1042, 1143, 1144 and 1145.

Figure 10:
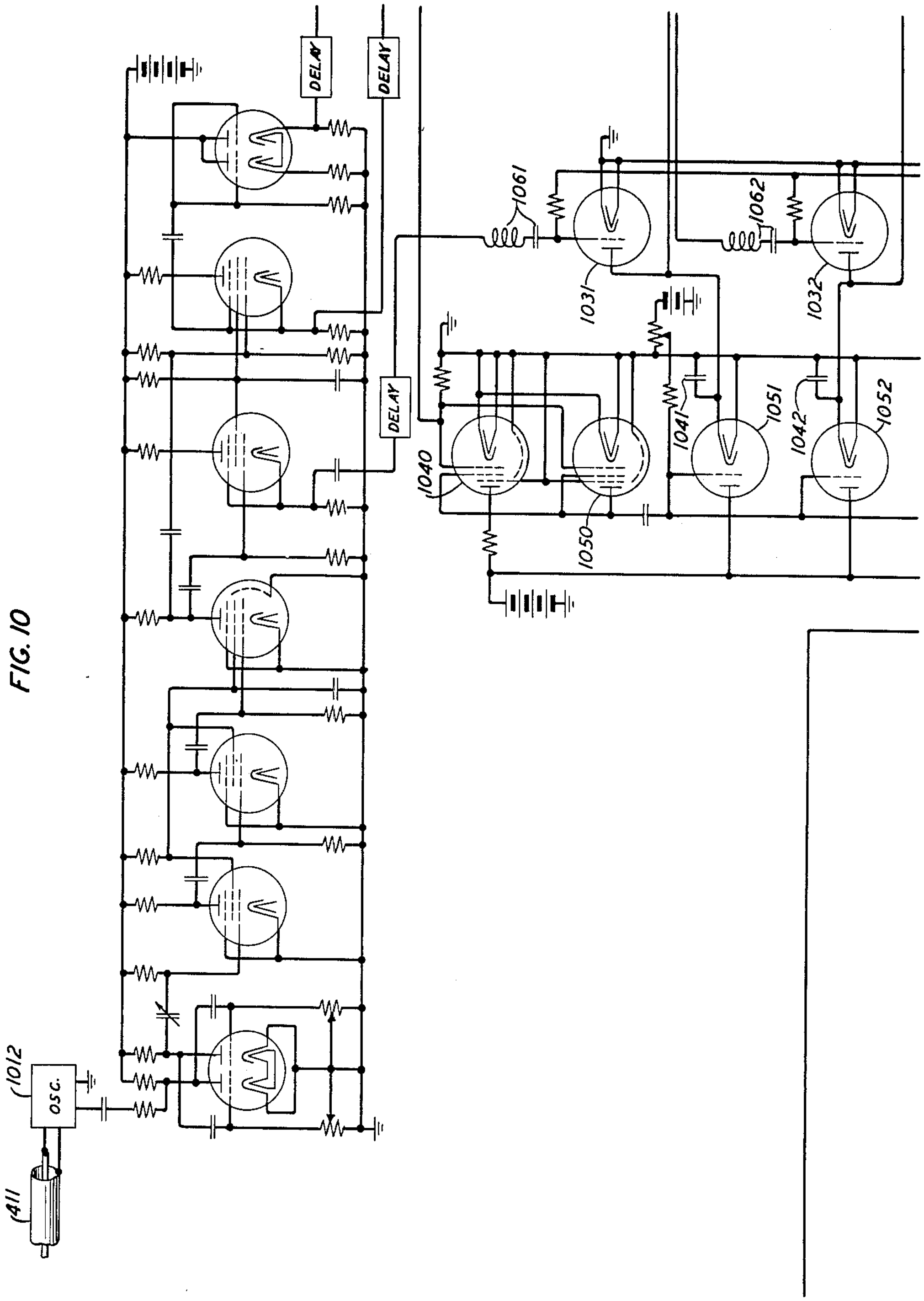
Figs. 10 through 13 show in detail the circuits at the receiving station.
Figure 11:
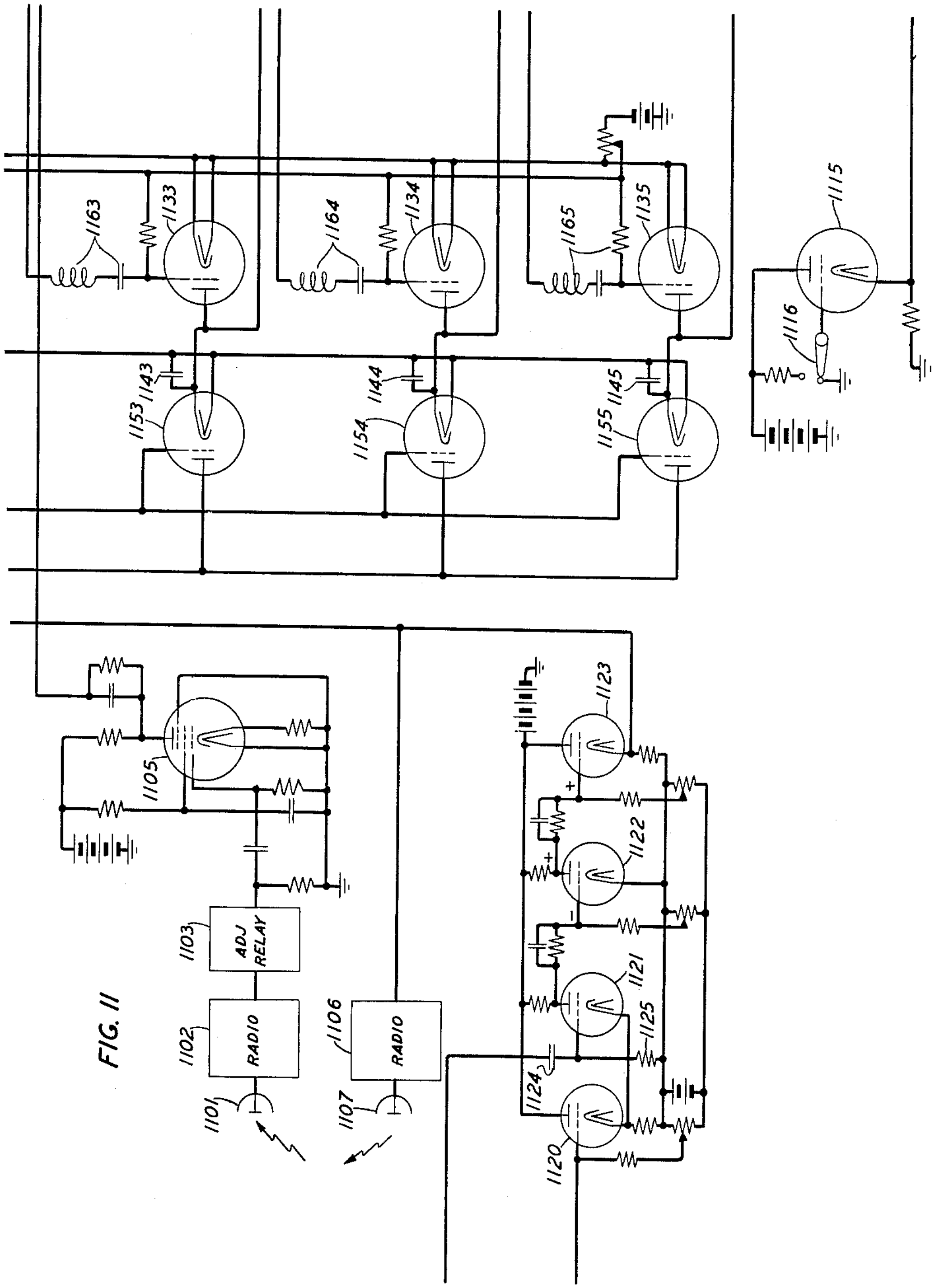

In addition to the pulse received from the common control and synchronizing circuits, a positive pulse is received from the synchronizing circuit of Fig. 10 for each complete code group of signals. This pulse applied to the control element of tube 1031 through the delay network comprising inductance and condenser 1061.

The simple delay network shown in the drawings usually will be satisfactory. However, if long delays are required this delay network may assume a more complicated and complex form. This delay network is provided so that the positive synchronizing pulse will be applied to the control element of tube 1031 at about the time the negative pulse, which is applied to the control elements of tubes 1051 through 1155, terminates. As a result, the application of the positive potential to the control element of tube 1031 causes current to flow in its anode-cathode circuit which current discharges the left-hand terminal of condenser 1041 and thus reduces its voltage. The voltage of the left-hand terminals of the remaining condensers 1042, 1143, 1144 and 1145 remain at their previously charged relatively high value because no positive pulse is applied to the control elements of the respective tubes 1032 and 1133 through 1135.

The left-hand terminals of all of these condensers are connected to a control element of the respective tubes 1221, 1222, 1323, 1324 and 1325. Upon the charging of the above series of condensers to a positive voltage current flows through the anode-cathode circuits of the respective tubes 1221, 1222, 1323, 1324 and 1325. However, upon the discharge of condenser 1041 as described above the current flowing through tube 1221 is interrupted because voltage of the left-hand terminal condenser 1041 is reduced below the cut-off voltage of tube 1221.

The anode circuits of the respective tubes 1221, 1222, 1323, 1324 and 1325 are coupled to one of the control elements of tubes 1211, 1212, 1313, 1314 and 1315.

Tubes 1211, 1212, 1313, 1314 and 1315 have biasing potentials applied to their various electrodes and control elements such that these tubes normally do not pass current in their anode-cathode circuits. In order for current to flow in their anode-cathode circuits of these tubes it is necessary that additional voltages be applied as follows: (1) a more positive potential be applied to the first grid or control element and (2) a more negative voltage be applied to the cathode as shown in the drawing. If only one of these two additional voltages are applied to the elements in the manner described herein no current will flow in the output circuit of the respective tube. However, if such additional potentials are applied to both of these elements current will flow in the output circuit of these tubes.

When current is flowing in the anode-cathode circuits of the respective tubes 1221, 1222, 1323, 1324 and 1325 the potential of the anodes of these tubes and thus the potentials of the control grids of tubes 1211, 1212, 1313, 1314 and 1315 are reduced to a sufficiently low value so that no current can flow in the output circuits of any of these tubes. However, when the current flowing in the output circuit of any one of these tubes 1221, 1222, 1323, 1324 and 1325 is interrupted, the voltage of the anodes of these tubes and thus the voltage of the control grids of the respective tubes 1211, 1212, 1313, 1314 and 1315 rises so that if and when the voltage of the cathode of these tubes is made more negative current will flow in the output circuit of the respective tubes. Thus when the current flowing through tube 1221 is interrupted in the manner described above, the voltage applied to the control element of tube 1211 is such that current may or may not flow in the output circuit of tube 1211 depending upon whether or not a received marking signal is applied to the cathode of this tube from the amplifier tube 1104. If the cathode of tube 1211 is made more negative at this time in response to the received pulse of the proper character current will flow in the output circuit of tube 1211. If, on the other hand, the received pulse is of the opposite character no current will flow in the tube 1211.

The pulse of current flowing in the output circuit of tube 1211 when the received pulse is of the proper polarity is a negative pulse and repeated by the cathode-follower or repeating tube 1271 and applied to the delay device 1281.

Thereafter upon the application of the next negative code element timing pulse of tubes 1040 and 1050 a positive pulse is repeated to the control elements of tubes 1051, 1052, 1153, 1154 and 1155 which pulse causes the left-hand terminal of condenser 1041 to be charged again to a relatively high positive voltage and any charge which may have leaked off to condensers 1042, 1143, 1144 and 1145 to be replaced so that these condensers will again be charged to their full positive value.

The application of a positive voltage to the left-hand terminal on condenser 1041 applies a positive voltage to the control element of tube 1221 which in turn causes current to flow in the anode-cathode circuit of tube 1221. This voltage reduces the voltage of the control grid of tube 1211 so that the voltage applied to the control element of tube 1211 is below the value required to cause current to flow in the output circuit of this tube independently of the signal voltage applied to the cathode of this tube. Thereafter, tube 1211 is unable to pass current in its anode-cathode circuit until a next code combination is received in the manner described above. When current starts to flow in the anode-cathode circuit of tube 1221 the voltage of the cathode of tube 1221 becomes more positive. This more positive voltage is applied through a delay and shaping network 1062 such that at the termination of negative pulse applied to the control elements of tubes 1040 and 1050 a positive pulse of short duration is applied to the control element of tube 1032 which voltage causes current to flow in the anode-cathode circuit of tube 1032 and discharge the left-hand terminal of condenser 1042. As a result, current flowing through tube 1222 is interrupted and a proper potential applied to the control element of tube 1212 to permit current to flow in the output circuit of this tube under the control of the received signaling pulses. If a received signaling pulse at this time is of a proper polarity or character, the pulse of current will flow in the output circuit of tube 1212. This pulse is repeated by tube 1272 and applied to the delay device 1282. Upon the termination of this pulse and due to the application of another pulse from the code element timing circuit to tubes 1040 and 1050 the distributor is advanced in the manner described above so that a pulse will be applied to the delay device 1383 if the proper polarity pulse is received at this time. In this manner, the succeeding pulses are distributed through the receiving distributor to the delay devices 1384 and 1385. Thereafter, another pulse will be applied to the control grid of tube 1031 in the manner described above and another series of pulses applied to the delay devices 1281, 1282, 1383, 1384 and 1385, and the above-described action repeated at a high rate of speed controlled by the synchronizing equipment.

The delay devices 1281, 1282, 1383, 1384 and 1385 are all designed with different delay times such that the sum of the delay times of these devices and the corresponding delay devices at the transmitting station is constant. In other words, the sum of the delay time of the delay devices 621 and 1281 is the same as the sum of the delay times of the delay device 622 and the delay device 1282. Likewise, the sum of the delay times of the delay devices 623 and 1383 is the same as the delay times of the sums of the other delay devices. As a result, the output of the delay device changes substantially simultaneously under the control of the change in potential applied to the coding elements 521 through 525 of the coding tube 510. In other words, the instantaneous amplitude of the transmitted signals as represented by the potentials simultaneously applied to the coding elements 521 through 525 of tube 510 has been transferred or transmitted to the receiving station where corresponding potentials are substantially similarly simultaneously applied to the output terminals of the delay devices 1281, 1282, 1383, 1384 and 1385.

Assume first that the switches 1207, 1231, 1232, 1333, 1334, 1335, 1261, 1262, 1363, 1364 and 1365 are positioned in the position shown in the drawing. Under these circumstances the potential conditions from the output of the delay devices 1281, 1282, 1383, 1384 and 1385 are applied to the control elements of the respective tubes 1291, 1292, 1393, 1394 and 1395.

As shown in Fig. 14, the target 1417 in an exemplary tube embodied in the system set forth herein has apertures cut in it in accordance with the binary code or binary number system. For the lowest magnitude of signal with the beam depressed toward the bottom edge of the aperture plate 1417 will find no apertures thus applying no potentials to the code element electrodes 1421 through 1425. As the beam is raised it will pass through an aperture in column 1435 thus applying a potential to the electrode 1425 thus indicating one unit of signal amplitude above the lowest level. As the beam is further raised it will pass through an aperture in column 1434 and through no other aperture. This indicates that the beam is at the second level above the lowest level at which time potential is applied to the code element electrode 1424. As the beam is still further raised it will pass through apertures in both columns 1435 and 1434 and apply corresponding potentials to the electrodes 1425 and 1424 thus indicating that the beam is at the third position above the lowest level. At the fourth position above the lowest position the beam will pass through an aperture of column 1433. In similar manner, the target plate 1417 is provided with additional aperture through which the beam may pass in accordance with binary number system and causes potentials to appear on the code electrodes which are in accordance with represented corresponding binary numbers. In other words, the electrode 1425 represents the units digit or denomination of the binary number, the electrode 1424 represents the next succeeding digit and so on. As is well understood in binary number systems these digits can have only one of two values, either zero or one. When these digits have zero no potential other than the biasing potential is applied to the corresponding code element electrodes 1421 through 1425. However, when the value of the digit is one, a signal potential differing from the bias potential is applied to the corresponding electrodes 1421 through 1425. As is also understood in binary number systems the digit of one in the units position represents a magnitude of one in the number digit of one, in the second position represents a magnitude two, digit one in the third position represents a magnitude four, digit one in the fourth position represents a magnitude of eight and a digit one in the fifth position represents a magnitude of sixteen. In this manner by combining various ones of these digits it is possible to represent all magnitudes including zero up to and including thirty-one. If additional digits are provided it is, of course, possible to represent a greater number of magnitudes.

At the receiving station, it is necessary to weigh each of the pulses representing these digits by the proper or corresponding values and combine or add them together.

Such an arrangement is disclosed at the receiving station. The output circuit of tubes 1291, 1292, 1393, 1394 and 1395 is arranged to properly weigh and combine the output of these tubes so that the combined output will be a function of the magnitude represented by the signaling pulses of each code combination and thus a function of the magnitude of the instantaneous amplitude of the applied signaling wave at the transmitting station at the time its amplitude is sampled and/or coded.

Tubes 1291, 1292, 1393, 1394 and 1395 are all biased so that they are normally conducting their maximum current. As a result, the voltage drops across anode resistors 1355, 1354, 1353, 1252 and 1251 are all a maximum value with the result that the anode of tube 1291 has a minimum voltage applied to it in the absence of any received marking pulses.

As pointed out above, the character of the signaling condition in the units digit is controlled by electrode 1425 of the tube shown in Fig. 14 or by the electrode 525 of tube 510 and when marking, for example, represents one unit of amplitude of the applied complex signaling wave. Thus, when this pulse is of marking character, for example, it represents one unit in the magnitude of the applied signal wave. The pulses of this signaling condition are transmitted to the receiving stations and applied to the control element of tube 1395. As pointed out above, the marking pulses are applied to the control element of tube 1395 as pulses of negative voltage. Consequently, these pulses tend to reduce the current flowing through tube 1395. This variation of voltage applied to the control element of this tube is such that the reduction of current flowing through tube 1395 causes an increase voltage across the anode resistor 1355 which increase represents one unit of amplitude of the complex wave. If no other change in current flowing through any of the other tubes 1291, 1292, 1393, 1394 is made, then the voltage of the anode of tube 1291 will rise by one unit of signal amplitude.

When a marking pulse corresponding to the second position of the binary number is received in response to the application of a signal wave of two units of amplitude applied to the coding equipment at the transmitting station or in which the amplitude applied to the coding equipment at the transmitting is represented in part by the marking pulse in the second position, this pulse is distributed to the control element of tube 1394 in the manner similar to that described above and appears as a negative pulse as applied to the control element of this tube. The negative pulse causes current to decreasee through tube 1394, which current also was previously flowing through the anode resistors 1354 and 1355. This decrease in current flowing through these resistors causes a voltage drop across the resistors to decrease with the result that a voltage of the anode of tube 1291 increases. The biasing and other potentials applied to tube 1394, together with the magnitude of the anode resistors 1354 and 1355, is such that the rise in voltage of the anode of tube 1291 under these circumstances, assuming no other marking pulses are applied to any of the other tubes, is equivalent to two units of signal amplitude.

If a marking pulse is received in both the units position and the next position, these two pulses represent a signal amplitude of three units of the signaling wave. When these pulses are applied to the control elements of tubes 1395 and 1394 they each produce a decrease in current through the respective tube in above-described amounts so that the rise in potential of the anode of tube 1291 will be the sum produced by the change in currents to the respective tubes or, in other words, the three units under the assumed conditions.

When a negative pulse is applied to the control element of tube 1393 it causes a decrease in the current flowing through the resistors 1353, 1354 and 1355 and produces a voltage rise across these resistors which when measured at the anode of tube 1291 is equivalent to four units of amplitude of the applied signal wave. Similarly, the decrease of current flowing in the output circuit of tube 1292 and through the resistors 1252, 1353, 1354 and 1355 causes a voltage rise across all of these resistors which is eight units of amplitude of the complex wave form. In addition, the decrease in current flowing through tube 1291 in response to a marking pulse which is a negative pulse as applied to the control element of tube 1291, causes an increase in voltage of the anode of tube 1291 which is sixteen units of amplitude of the complex wave form.

Furthermore, as pointed out above, due to the operation of the delay devices 1281, 1282, 1383, 1384 and 1385, the respective pulses of each code group are all applied substantially simultaneously to the control elements of tubes 1291, 1292, 1393, 1394 and 1395. Consequently, the voltage changes as described above due to the negative pulses applied to the control elements of the above enumerated tubes are all applied substantially simultaneously, consequently, the output voltage, that is, the voltage of the anode of tube 1291 due to the change in current flowing through the resistors 1251, 1252, 1353, 1354 and 1355 are all added together since the change takes place substantially simultaneously through all of the tubes and all of the resistors are connected in series. In other words, the voltage at the anode of tube 1291 is caused by the sum of the voltage drops in the anode circuits of the other tubes. As a result, the voltage at the anode of tube 1291 when the signaling pulses are applied to the tubes 1291, 1292, 1293, 1294 and 1295 is a function of the amplitude of the complex wave form represented by the pulse code group applied to the control elements of the above enumerated tubes.

Novel features of the above decoding apparatus which are disclosed but not claimed herein are claimed in the copending application of Carbrey Serial No. 783,187, filed October 30, 1947.

The anode of tube 1291 is coupled to the grid of tube 1229 which tube, with switch 1207 engaging contact 1208, operates as a repeating tube and repeats the pulses from the output circuit of tube 1291 to the low-pass filter 1250 which low-pass filter removes the high frequency components of the applied pulses and, in effect, reconstructs the complex wave form of the signaling wave applied to the system at the transmitting station. The reconstructed output wave form is transmitted through the terminal equipment 1254 to a receiving device 1255.

Figure 19:
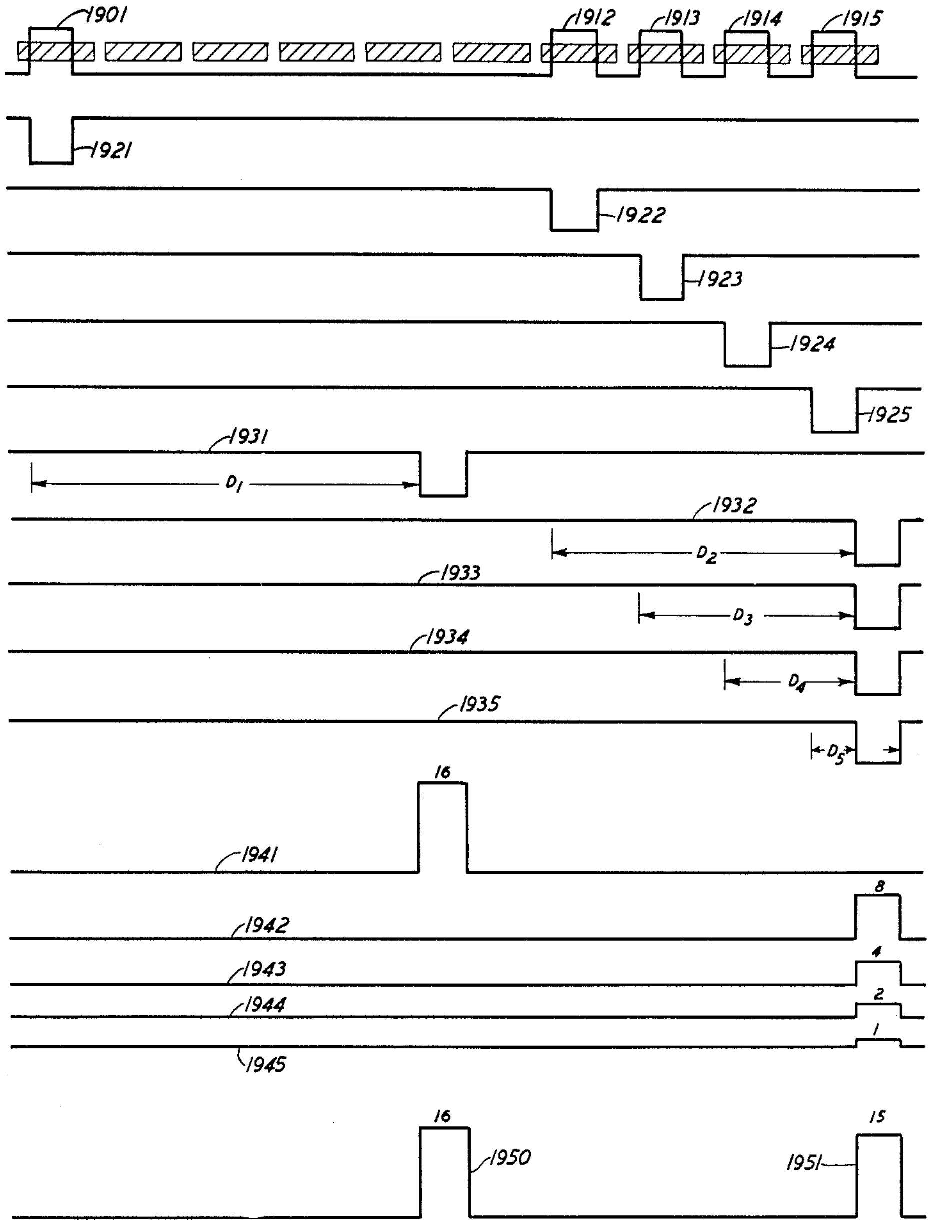

The operation of the receiving and decoding equipment is further illustrated by the graphs shown in Fig. 19. The first graph represents typical received pulses and shows two code groups of pulses similar to the pulses transmitted from the transmitting station as described above with reference to Fig. 18. In this case, the first code group comprises a marking pulse in the first or largest digit and a second code group comprises four marking pulses in the other four positions. Thus, pulse 1901 represents an amplitude of sixteen units in the first code group. Pulse 1912 represents eight units in the second code group, pulse 1913, the second code group, represents four units, pulse 1914 represents two units and pulse 1915, one unit of signal amplitude. Thus, this code combination represents an amplitude of the complex wave form, at the time this code group was determined, of fifteen units of signal amplitude.

The shaded rectangles, superimposed upon the above described pulses, represent the time during which the various distributor tubes are conditioned to distribute the pulses to the various decoding tubes. As a result, the marking pulse in the first code group of pulses is distributed as a negative pulse 1921 to tube 1291. Likewise, pulse 1922 represents the negative pulse of the second code group distributed to tube 1292. It is similar to the other pulses 1913 to 1915 which distribute as negative pulses to the respective tubes 1393, 1394 and 1395. These pulses are represented in Fig. 19 at 1923, 1924 and 1925. As described above, these pulses from the distributor tubes are transmitted through the respective delay lines 1281, 1282, 1383, 1384 and 1385 and then applied to the control elements of the decoding tubes enumerated above. The delay time for the pulses transmitted through the delay device 1281 is illustrated by the delay time D–1 in graph of Fig. 19. The voltage applied to the control element of tubes 1291 is shown by graph 1931. Other pulses of the second code combination are likewise delayed corresponding shorter intervals of time so that these pulses appear at the output terminals of the delay devices substantially simultaneously as shown in graphs 1432, 1433, 1434 and 1435.

The negative pulse applied to the control element of tube 1291 interrupts current flowing through the anode circuit of this tube and through all of the anode resistors 1251, 1252, 1353, 1354 and 1355. As a result, the voltage of the anode of tube 1291 rises to a value of sixteen units amplitude as shown by pulse 1941 in Fig. 19 which in turn causes a pulse of sixteen units of amplitude 1950 to be applied to the control element of tube 1219 and repeated thereby. The above described operation is assumed to be in response to the pulse of the first code group on the left as shown in Fig. 19 which comprises a marking pulse in the first or left-hand position.

In response to the second code group of pulses assumed above, a negative pulse illustrated by graph 1932 is applied to the control element of tube 1292. A similar pulse shown by graph 1933 is applied to the control element of tube 1393, likewise pulses as shown in graphs 1934 and 1935 are applied to the control elements of the respective tubes 1394 and 1395. The pulse applied to the control element of tube 1292 causes a rise in potential of eight units due to a decrease in current through tube 1292. This rise in potential is illustrated by graph 1942. The rise in potential in response to the respective tubes 1393, 1394 and 1395 is illustrated in graphs 1943, 1944 and 1945. It should be noted that due to the action of the delay device described above, pulses are applied substantially simultaneously to the control elements of all of the decoding tubes with the result that the change in potential conditions due to each pulse is properly added to the change in potential conditions produced by all of the other pulses of the given code group. Pulse 1950 represents the pulse of sixteen units amplitude generated under control of the first code group of pulses while pulse 1951 represents an amplitude of fifteen units which was generated under control of the pulses of the second code group as described above. These pulses are then transmitted through the low-pass filter in the manner described above and the complex signal wave reconstructed in response to the application of these pulses to the low-pass filter equipment.

The terminal equipment 1254 may be similar to the terminal equipment 502 described hereinbefore. It may include any of the various types of transmission and switching equipment described with reference to terminal equipment 502 independently of whether or not the terminal equipment 502 includes the same type of such equipment as the terminal equipment 1254.

The receiving device 1255 is shown as a telephone receiver which will respond to the voice currents from microphone or signal source 501. This receiver 1255 is merely representative of a receiving device of the type suitable for response to the signals generated by the signal source 501. If the signal source 501 produces other types of signaling currents then a receiving device 1255 will be arranged to respond to these other types of signaling currents. For example, if the signal source 501 comprises telegraph transmitting apparatus then the receiving device 1255 will comprise telegraph receiving apparatus of the type which will respond to the signals transmitted by the source 501. Likewise, if source 501 comprises a source of picture currents then receiver 1255 will include apparatus responsive to such picture currents or to device for storing this signal for later use.

The decoding equipment comprising tubes 1291, 1292, 1393, 1394 and 1395 decodes the pulses of the code combinations and produces a potential drop across the combined anode resistors 1251, 1252, 1353, 1354 and 1355 having a magnitude which is a function of the particular code group received. In order to provide a high degree of accuracy of the operation of such a decoding arrangement it is desirable that the tubes 1291, 1292, 1393, 1394 and 1395 operate as constant current sources or devices. In other words, the current transmitted or passed by these tubes should be a function of the received signal pulses but not a function of the anode voltages applied to the respective tubes. In other words, the current through the tubes should be substantially independent of the voltage applied to the anode of the respective tubes from the combined anode network described above. Under these circumstances, the voltage drop produced by current in each tube and thus by the repetition of the respective pulses produces a voltage drop in the output circuit of these tubes which is independent of any of the other tubes and thus independent of any of the other pulses of a given code combination.

Furthermore, it is assumed that the consecutive pulses and also the consecutive electrodes 521 through 525 represent consecutive digits of a binary number. It will be apparent that such an arrangement is not essential so long as the signaling potential applied to each one of the code electrodes 521 through 525, inclusive, always represents the same fraction of the instantaneous amplitude of the complex wave at the time the code is determined. Under these circumstances, the pulses may be set in any order desired by interchanging the various delay devices 621, 622, 623, 824 and 825 provided, of course, the corresponding receiving delay devices 1281, 1282, 1383, 1384 and 1385 are correspondingly changed so that the sums of the delay intervals by each pair of the delay devices, that is, one transmitting and corresponding receiving delay devices, are all substantially the same. The same results may be obtained by connecting the various delay devices in different paths between the code element electrodes of tube 510 and the distributor tubes 811 and 912 through 915 provided that the corresponding changes in connections are made between the delay devices between the receiving distributor tubes 1211, 1212, 1313, 1314 and 1315 and the decoding tubes 1291, 1292, 1393, 1394 and 1395.

*Coding to represent changes in amplitude*

The foregoing description of the operation of the system with the various switches set in the position described, the system operates to transmit code groups of pulses at rapidly recurring instants of time, each code group of which represents the magnitude of the instantaneous amplitude of the complex wave form to be transmitted at each of a plurality of rapidly recurring instants of time. These code groups are decoded at the receiving station and a complex wave reconstructed.

By changing switches 641, 642, 643, 744 and 745 at the transmitting station the circuits will operate to transmit code groups of pulses in which each code group of pulses no longer represents the magnitude of the complex wave form at each of the instants of time at which the code is determined, instead each code group will now represent the magnitude of the change in amplitude of the complex wave form between each of the instants of time the codes are determined.

Assume, for example, that switch 641 has been positioned to engage contact 646, switch 642 positioned to engage contact 648, switch 643 positioned to engage contact 656, switch 744 positioned to engage contact 716 and switch 745 positioned to engage contact 718.

With the switch 641 engaging contact 646 instead of contact 647 the output of the delay device 621 no longer is applied through the repeating tubes 661 and 671 to the control grid of tube 811. Instead, it is applied to the cathode circuit of tube 631 and to the grid or control element of tube 616. Thus, when the beam of electrons falls on the code element electrode 521 of tube 510, electrons make this element more negative and cause the grid of tube 611 to become more negative. As a result, the cathode of tube 611 also becomes more negative. This negative potential is then transmitted to the delay line 621 and after the delay interval of the delay device 621 its output terminal also becomes more negative. This more negative potential is applied to the cathode of tube 631 and the control grid of tube 616. Tube 631 causes its anode to also become more negative in response to the negative potential applied to its cathode. The application of this negative potential to the control element of tube 616 causes the anode of tube 616 to become more positive. The control element of tube 617 is connected to the anode of tube 616 and as a result more current flows in tube 617 causing a greater potential drop across the anode resistor 620 which is common to tubes 617 and 618. The greater potential drop across the common anode resistor 620 reduces the voltage of these anodes and also the voltage of control element of tube 619 connected thereto. Consequently, less current flows through tube 619 causing its anode to rise to a more positive voltage. The anode of tube 619 is coupled to the anode of diode 626. The application of a positive voltage through the coupling condenser causes this diode to conduct current and apply a positive pulse to the control element of the right-hand section of tube 628. Consequently, a positive pulse is repeated in the cathode circuit of this tube to the control element of tube 811. This pulse is of sufficient duration so that a pulse will be transmitted by tube 811 when it is rendered active by a distributor arrangement shown in Figs. 8 and 9 in the manner described above.

When the anode of tube 631 becomes negative in response to the negative potential applied to this cathode, this negative voltage or potential condition is transmitted down the delay line 651. The delay line 651 is provided with a delay interval substantially equal to the repetition interval of the code combinations. In other words, the delay interval is equivalent to the time of a complete code group of pulses, i. e., one hundred microseconds under the conditions assumed above. When the applied signal is sampled as described above, the charge on condenser 554 remains substantially fixed the time of a complete code group or multiples thereof. As a result, the potential on the output code electrodes likewise remains the same for a like interval of time as described above and shown in Fig. 18. Assuming that the electron beam continues to impinge upon the code element electrode 521 for an interval of time greater than the time of a complete code group or multiplex cycle. Then at the end of the delay interval of the delay line or device 651 a negative potential is applied to the control element of tube 618. This delayed negative pulse is repeated by tube 618 so it substantially cancels the potential condition repeated by tube 617 in the common anode resistor 620. As a result, the positive potential applied to the anode of diode 626 by repeating tubes 619 is removed and a corresponding positive potential from the cathode of tube 628 likewise removed. A diode 627 is biased at this time so that no current will flow in its output circuit due to the change in current flowing through the tube 619 when the potential of this grid is restored to its original value. Consequently, the next code group transmitted from the distributor equipment will not include a pulse current through the tube 811 when this tube is activated during the succeeding cycles of operation of the multiplex equipment shown in Figs. 8 and 9.

As a result, a pulse is transmitted from tube 811 in response to the electron beam in tube 510 falling upon the electrode 621 the first time the associated distributor tube 811 is activated thereafter. So long as this electron beam continues to fall upon this electrode no further pulses are transmitted through tube 811 during the subsequent cycles of operation of the distributor equipment.

At a later time when the electron beam in tube 510 is shifted so that it no longer falls on the electrode 521 the potential of this electrode will rise and as a result, additional current will flow through tube 611 causing a more positive voltage to appear on the cathode of this tube. This more positive voltage is transmitted down the delay line or device 621 and after the delay interval of this device a more positive voltage will appear on its output terminals. This more positive voltage is applied to the control element of tube 616 which repeats a negative voltage in its ouput circuit and thus interrupts or reduces the current flowing through tube 617 and the common anode resistor 620. The reduced current through anode resistor 620 causes the voltage of the anodes of tubes 617 and 618 to become more positive with the result that tube 619 conducts more current. The cathode of tube 619 will become more positive at this time and apply a positive voltage to the anode of diode 627 thus causing diode 627 to conduct current and apply a positive voltage to the control element of the left-hand section of tube 628. Tube 628 repeats this more positive voltage on its cathode circuit and consequently applies a positive voltage to the control element of tube 811. The next time tube 811 is activated by distributing equipment of Figs. 8 and 9 causing a pulse of current to flow in the output circuit which pulse will be transmitted to the receiving station in the manner described hereinbefore.

The positive voltage applied to the cathode of tube 631 at this time causes a more positive voltage to be repeated to the anode of this tube which positive voltage condition is transmitted down the delay line 651. The delay line 651 is terminated so that substantially no reflection takes place at the terminals thereof. When this voltage arrives at the output terminals of the delay line after the delay interval of this line this voltage will cause more current to flow through tube 618 and thus through the common anode resistor 620 compensating for the decrease in current due to the negative potential applied to the control element of tube 617. As a result, the potential of the anodes of tubes 617 and 618 and the control grid of tube 619 becomes less positive. Tube 619 thereupon conducts less current. However, tube 619 in conducting less current interrupts the current flowing through diode 627 but due to the bias potential applied to the diode 626, current does not flow through diode 626 at this time. As a result, the positive potential is removed from the control element of the tube 811 which tube will not thereafter cause a pulse of current to be transmitted when it is activated during the succeeding cycles of a multiplex distributor equipment.

It is thus apparent that by operating switch 641 to the position where it engages contact 646 a code pulse is transmitted to the distant station every time the electron beam first falls upon the electrode 521 or first ceases to fall upon this electrode. In other words, a pulse is transmitted only when the potential or voltage upon the code element electrode 521 changes.

The electrodes 522 and 525 are connected to similar circuits for causing pulses to be transmitted only when the voltage condition of these electrodes changes.

The change in potential on the electron beam in shifting from one row of apertures in the aperture plate 616 will generally be of extremely short duration so that a circuit may be arranged not to respond to such potential conditions of such short duration.

The code element electrodes 523 and 524 are connected to similar types of circuits which operate in a somewhat different manner. These circuits operate to produce the same results but require somewhat less equipment. The circuits are, however, more critical in adjustment. Assume, for example, that the electron beam falls on electrode 523 and applies a negative signaling condition to the grid of tube 613. The negative signal condition is repeated to the cathode of tube 613 and then transmitted down the delay line 623. After the delay interval of the delay line or device 623, a negative signaling condition is applied to the control element of tube 633 which repeats a positive signaling condition in the anode circuit of tube 633. The control element of tube 639 is connected to the anode of tube 633 and as a result this tube conducts more current causing a positive signaling condition to be applied to the cathode of tube 639 and a negative signaling condition to the anode of this tube. As a result, the diode 637 conducts current and applies a positive voltage to the left-hand section of tube 638 which tube repeats this voltage and applies it to the control grid of tube 913; switch 643, of course, being operated or positioned to engage contact 656. Consequently, the next time tube 913 is activated by the distributor equipment of Figs. 8 and 9 in the manner described above, a pulse is transmitted to the receiving station.

The positive signaling voltage repeated in the anode circuit of tube 633 in response to the electron beam falling on element 523 is transmitted down the delay line 653. The delay line 653 is short-circuited at the end not connected to the anode of tube 633. As a result, the voltage condition is reversed and transmitted back to the anode circuit of tube 633 and when it arrives back at the anode of tube 633 it cancels the original positive voltage applied to this anode and as a result the circuit conditions in tube 639 are restored to their initial conditions at which time neither diode 636 nor 637 conducts current. Consequently, a positive signaling voltage is removed from the control element of tube 913. By adjusting the delay time of the delay device 653 to be substantially one-half the time interval of a complete multiplex cycle, the reflected pulse will arrive back at the anode of tube 633 substantially one multiplex cycle later so that the positive voltage is applied to the control element of tube 913 for only one multiplex interval, consequently, only one positive pulse is transmitted over the multiplex system at this time. Thereafter, as long as the electron beam falls upon the code electrode 523 of tube 510 the circuits remain in the position described during which time no further pulses are transmitted by tube 913.

When the electrons falling on the electrode 523 are interrupted due to the beam being moved to a position where no aperture appears in front of this electrode the negative signaling condition is removed from electrode 523 and as a result, more current flows through tube 613 causing a positive signaling voltage to be transmitted down the delay line 623. This positive signaling voltage is applied to the control element of tube 633 and repeated in the output circuit of this tube as a negative signaling voltage. The negative signaling voltage is then applied to tube 639 which causes the current flowing through this tube to be interrupted or reduced with the result that the anode of this tube becomes more positive applying a more positive voltage to the anode of diode 636. The diode 636 thereupon conducts current and applies a positive voltage to the control element of the right-hand section of tube 638. Positive voltage is repeated in the cathode circuit of this tube and applied to the control element of tube 913. Consequently, when tube 913 is again conditioned during the subsequent multiplex cycle it will conduct current and cause a pulse to be transmitted to the distant station.

The negative voltage condition applied to the anode of tube 633 is also transmitted down the delay line 653 and reflected at the distant end back to tube 633. As is pointed out above, this delay interval is substantially a multiplex interval and at the end of this delay interval which is twice the delay interval of the delay line 653, a reversed polarity pulse is received back at the anode of tube 633 cancelling the original signaling condition and restoring the circuits to their initial condition wherein no positive potential is applied to the control grid of tube 913, consequently, no further pulses are transmitted through this tube during a succeeding multiplex interval until electrons again fall upon the electrodes 523 of the coding tube 510.

It is thus apparent that pulses are transmitted only when the potential conditions of the respective electrodes 521 to 525 change. It is further apparent that the amount of change in the amplitude of the complex wave between coding intervals determines which ones of the potential conditions change, thus, the pulses transmitted represent changes in amplitude of the signal wave rather than the absolute amplitude of the wave at each of the times the codes are determined.

When the switches at the transmitting station 641, 642, 643, 744 and 745 are positioned to make contact with the respective contacts 646, 648, 656, 716 and 718 the pulses transmitted are a function of the change in the amplitude of the complex wave between the sampling intervals, that is, between the times the codes are determined as describd above. Under these conditions, switches 1207, 1231, 1232, 1333, 1334 and 1335 at the receiving station are positioned so that they engage respective contacts 1209, 1241, 1242, 1343, 1344 and 1345. Likewise, switches 1261, 1262, 1363, 1364 and 1365 are positioned so that they engage the respective contacts 1236, 1238, 1316, 1318 and 1320.

With switch 1231 engaging contact 1241, the output of the delay device 1281 is applied to the cathodes of tubes 1216 and 1217 through a coupling condenser. Coupling condenser together with the common cathode resistor are such that the pulse applied to these cathodes is of substantially the same wave shape and duration as the pulse from the output of the delay device or line 1281.

Tubes 1216 and 1217 are connected in a double stability circuit of the type sometimes called an Eccles-Jordan circuit. Such circuits are stable in either one of two conditions, that is, with tube 1216 conducting and tube 1217 non-conducting or vice versa, with tube 1217 conducting and tube 1216 non-conducting.

In order to properly condition the tubes such as 1216 and 1217, rectifiers or diodes 1286, 1287, 1388, 1389 and 1390 have been provided. These rectifiers are connected to the output of tube 1115 so that when the grid of tube 1115 is driven positive by the operation of key 1116 the control grids of tubes 1216, 1218, 1312, 1322 and 1332 are driven positive with the result that any of these tubes which are not conducting current starts to conduct current and interrupt current flowing in the opposite tube. The application of a positive voltage to the control grid of any of the tubes above enumerated which are conducting current at this time produces no effect with the result that upon the release of the key 1116 all of the tubes 1216, 1218, 1312, 1322 and 1332 of the flip-flop circuits associated with each of the pulse positions remain conducting. Further, the voltage of the cathode of tube 1115 is sufficiently low at this time so that no current passes through rectifiers or diodes 1286, 1287, 1388, 1389 and 1390 with the result that these diodes effectively isolate the various flip-flop circuits so that they do not interfere one with another.

With all of the tubes corresponding to tube 1216 conducting, the tubes corresponding to tube 1217 are non-conducting with the result that their plate voltages are at their highest values. Under these circumstances, and with the switches 1261, 1262, 1363, 1364 and 1365 are moved so that they engage the respective contacts 1236, 1238, 1316, 1318 and 1320 and connect the control elements of the respective tubes 1291, 1292, 1393, 1394 and 1395 to the plates of the respective tubes 1218 and corresponding tubes of the other channels. Inasmuch as the anodes of these tubes are at their more positive value the control elements or grid of the decoding tubes 1291, 1292, 1393, 1394 and 1395 are also at their more positive values with the result that these tubes are all conducting current so that the anode of tube 1291 is at its lowest value. The setting of these tubes corresponds to the application of the lowest magnitude of amplitude of the applied signaling wave wherein the electron beam of tube 510 does not fall upon any of the output code elements 521 to 525. The above set of conditions are shown graphically at the left-hand end of graphs 2011 through 2015, inclusive, of Fig. 20, which show the potentials of the output code elements 521 through 525, inclusive, at their more positive values. The left-hand portions of the graphs 2121 to 2125 of Fig. 21 similarly show the output of the tubes corresponding to tube 1217 at their more positive values in response to the above described signaling condition.

Figure 20:
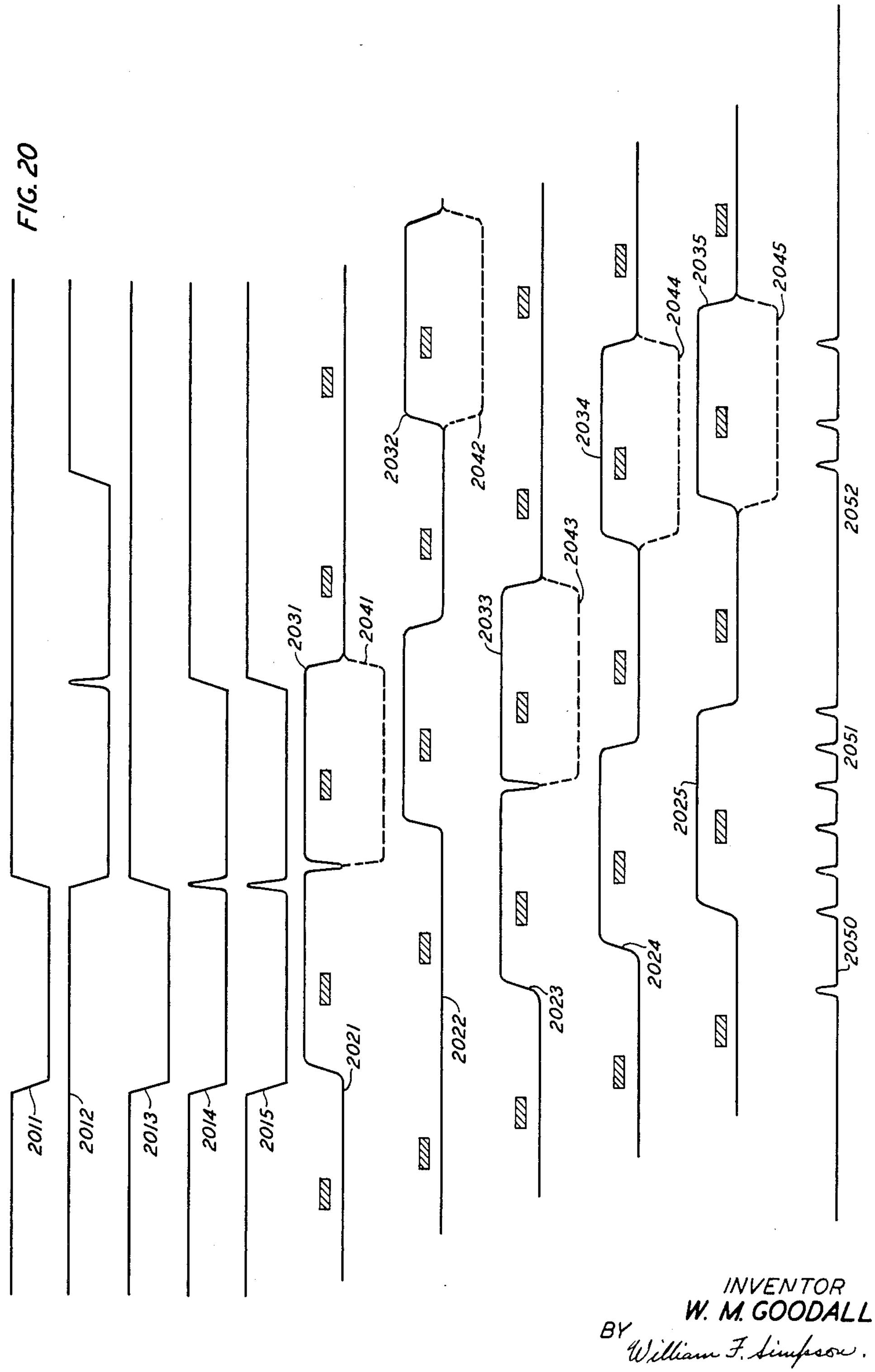

In the graph shown in Fig. 20, it is assumed that at a slightly greater later time the electron beam moves from its lowermost position so that it will pass through four apertures and fall upon the collecting electrodes 521, 523, 524 and 525, but not upon the collecting electrode 522 with the result that these electrodes become more negative at this time. Consequently, a negative step voltage is transmitted down the respective delay lines 621, 623, 724 and 725 which in turn cause positive pulses to be transmitted through the diodes 626 and 637 and the corresponding diodes of Fig. 7 to the control elements of the distributor gate tubes 811 and 912 through 915, inclusive. This operation is illustrated by the graphs 2021, 2022, 2023, 2024 and 2025 which graphs show the voltages applied to the respective tubes 811, 912, 913, 914 and 915. As is shown by these graphs positive pulse or potential is applied to the control grids of the respective gate tubes 811 and 913 through 915, inclusive. The potential applied to the control grid of tube 912 is not sufficiently positive so that this tube does not conduct current when it becomes activated as described above. The shaded rectangles superimposed upon the graphs in Fig. 20 represent the times during which the various gate distributor tubes are rendered active by a positive voltage applied to their screen grids in the exemplary embodiment set forth herein in the manner described above. When the control grid is positive at the time the tubes are rendered active the pulses are transmitted over the radio system as described above. These positive pulses are represented by the graph 2050 which represents the code group transmitted in response to the change in position of the electron beam from its lowermost position to a position representing twenty-three units of amplitude wherein pulses are transmitted in the first, third, fourth and fifth positions.

Figure 12:
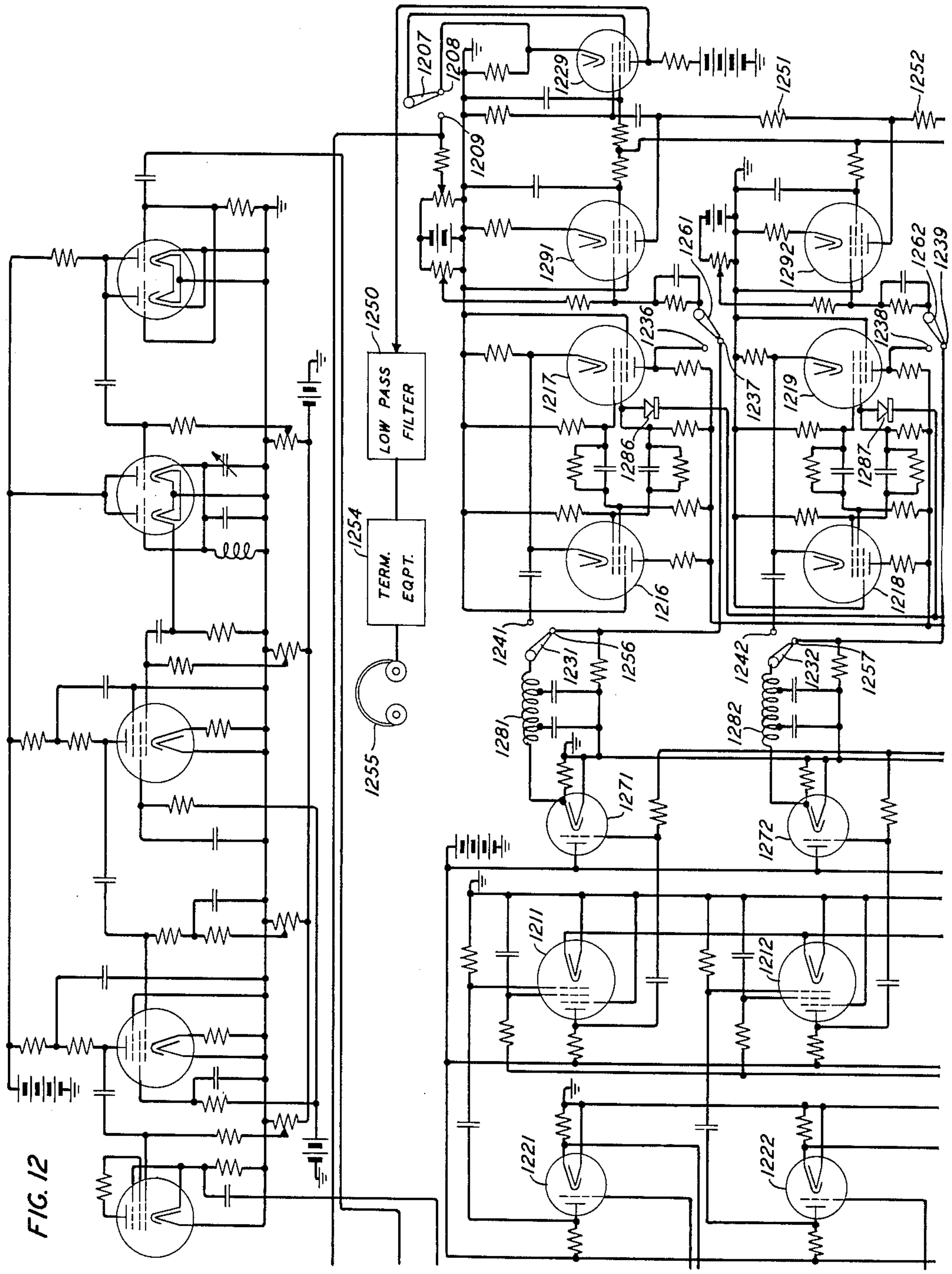
Figure 13:
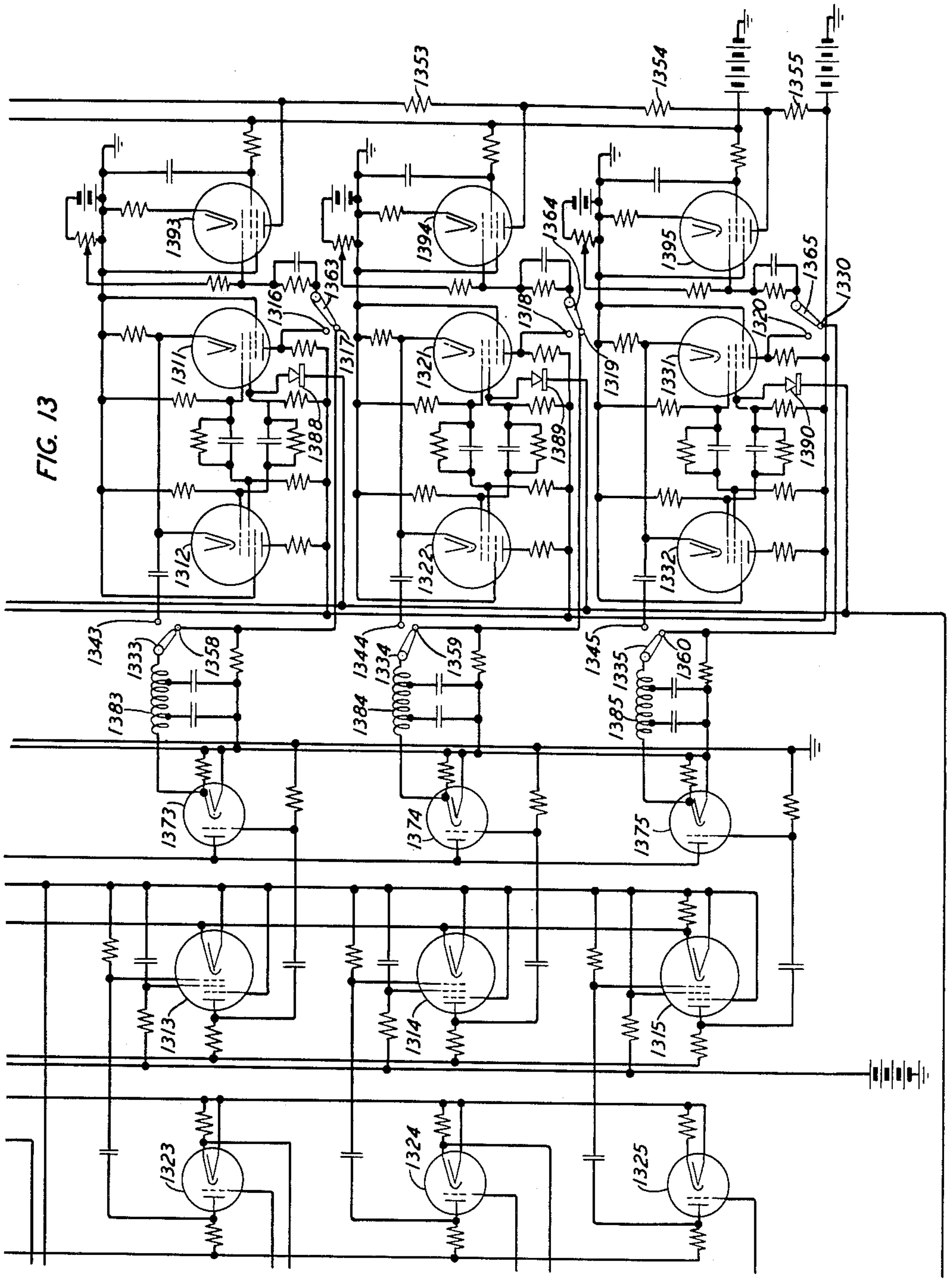

Graph 2110 represents the signals as received in the receiving station. These signals are transmitted through the multiplex system and distributor and the various delay lines or other delay devices 1281, 1282, 1383, 1384 and 1385. The pulses appear at the ends of these delay lines or devices substantially as illustrated by the graphs 2111 through 2115, inclusive. As shown in the graphs in Fig. 21 these pulses are negative pulses and are applied to the cathodes on both tubes of the respective flip-flop circuits as shown in Figs. 12 and 13. As a result, both tubes in the flip-flop circuits become conducting for the duration of the pulse. At the termination of the pulses, tube 1216 is rendered non-conducting and the corresponding tubes of Fig. 13 are likewise rendered non-conducting. Tube 1217, however, and the corresponding tubes of Fig. 13 remain conducting at this time. These conditions are represented by the graphs 2121 through 2125 of Fig. 21.

Figure 21:
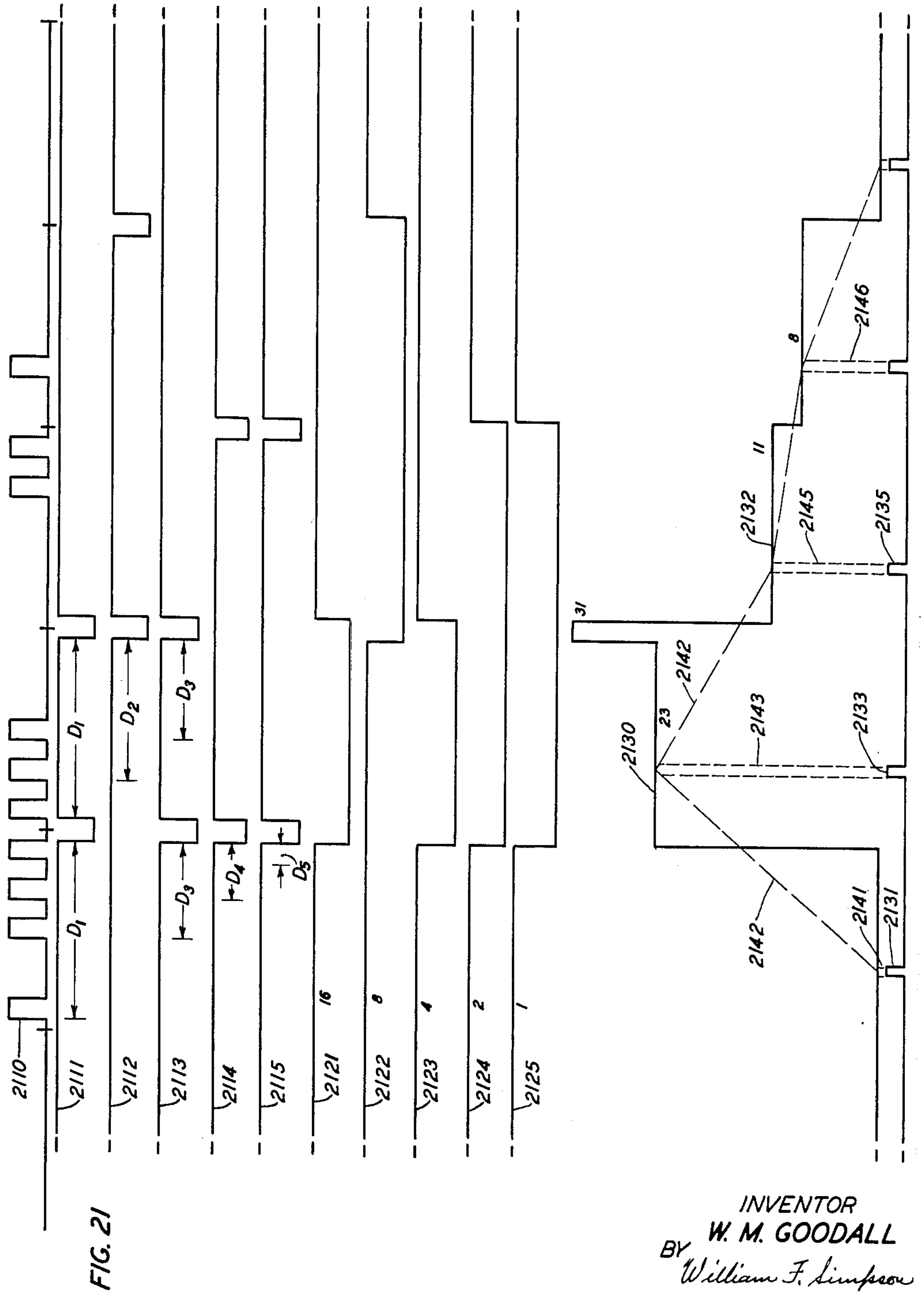

As a result, the voltage of the control elements of tubes 1291, 1393, 1394 and 1395 is reduced so that the current flowing through these tubes is reduced or interrupted, consequently, the voltage of the anode of tube 1291 rises to a value representing twenty-three units of amplitude in the manner described above. With switch 1207 operated to engage contact 1209, a delayed pulse from the synchronous pulse generator shown in Fig. 10 is applied to one of the control elements of tube 1229 causing an output pulse to flow in the output circuit of this tube. This delayed pulse is shown in Fig. 21 at 2133. The magnitude of this output pulse will be controlled by the magnitude of the voltage applied to the control grid of the tube at the time of the pulse and thus be a magnitude corresponding to twenty-three units of signal amplitude. Such a pulse is illustrated by the dotted pulse 2143 of Fig. 21.

As shown in Fig. 21, it is further assumed that the next time the incoming wave is sampled in the manner described above the applied signal wave will have an amplitude of eleven units. Consequently, the electron beam falls upon the output electrodes 522, 524 and 525, but does not fall upon the electrodes 521 and 523. These signaling conditions are illustrated during the third frame or complete code group interval of time by the upper five graphs 2011 through 2015 of Fig. 20. As a result, the negative pulse or a pulse of opposite polarity to that described above is transmitted through tube 619 which pulse is illustrated by the dotted graph 2041. However, due to the connection of diode 627 to the cathode of tube 619, a positive pulse illustrated by pulse 2031 is applied to the diode 627. As a result, during the time tube 811 is rendered active, a positive pulse is transmitted over the radio system. Pulses are also transmitted over the radio receiver during second and third pulse intervals, but not during the fourth and fifth pulse intervals because no change in potential occurred in the output electrodes 524 and 525 of tube 510. The second set of pulses 2051 illustrates the code group of pulses transmitted in response to the electron beam moving from the twenty-third position to the eleventh position. The graphs of Fig. 21 show the corresponding pulses at the receiver. Thus, graphs 2111, 2112 and 2113 show negative pulses applied substantially simultaneously to the cathodes of both of the tubes of the first three pairs of flip-flop tubes. These pulses cause potentials applied to the control elements of the decoding tube 1291, 1292, 1393, 1394 and 1395 to change as illustrated in graphs 2121 through 2125, inclusive. It should be noted that a pulse was transmitted in the first position in both code groups 2050 and 2051. This pulse causes the voltage applied to the control element of tube 1291 to first become more negative and upon the second transmission of this pulse the voltage applied to the control element of this tube again becomes more positive. This is a wave form substantially the same as applied to the code electrode 521 of tube 510. Substantially the same conditions exist with respect to the voltage applied to the control element of tube 1393 and the voltage of the output electrode 523. Inasmuch as the voltage applied to the electrodes 524 and 525 do not change between the times the first and second samples represented in the top of Fig. 20 were taken, no pulse is transmitted during these pulse intervals, consequently, no change takes place between the two tubes of each of the last flip-flop circuits of Fig. 13. This arrangement is clearly illustrated by graphs 2124 and 2125. Likewise, the output at this time is illustrated by the portion of the graph 2132 so that when pulse 2135 is applied to a control element of tube 1229, a pulse representing eleven units of amplitude and illustrated by dotted pulse 2145 is transmitted to the low-pass filter equipment.

It is further assumed in Fig. 20 at the next sampling period that the amplitude of the complex wave is eight units with the result that the electron beam falls upon only the output electrode 522. These conditions are shown during the third interval of the graphs of Fig. 20 and the pulse code group 2052 represents pulses transmitted in response to the change in signal amplitude from eleven units to eight units inasmuch as this change represents a change in the potential conditions of the last two code elements 524 and 525, pulses are transmitted only during the fourth pulse intervals of this code. These pulses are transmitted to the receiving station as illustrated by graphs 5414 and 5415. These pulses cause the potential conditions of the last two flip-flop circuits to reverse as shown in graphs 2124 and 2125 with the result that a pulse of eight units such as dotted pulse 2146 is transmitted through output tube 1219 when the third pulse shown in Fig. 21 is applied to the control element of this tube.

It is thus apparent that each time the potential applied to one of the output code electrodes of tube 510 changes a pulse of one character is transmitted over the radio system which character is assumed to be marking and so illustrated and described herein. This pulse as received at the receiving station changes the conducting conditions of the corresponding flip-flop circuits with the result that the potential output from these flip-flop circuits are substantially identical with the voltage of potentials on the code electrodes of the coding tube 510 at the transmitting station. These potentials are then decoded and combined in the manner described above. The combined potentials are then employed to control the amplitude of pulses repeated by tube 1219 as shown by the dotted pulses 2141, 2143, 2145, 2146, etc. These pulses of varying amplitude together with the subsequent pulses from tube 1229, one for each code group is transmitted through the low-pass filter where their high frequency components are removed and the signaling wave such as shown by the dash line 2142 similar to the wave applied at the transmitted station is reconstructed.

What is claimed is:

1. In combination apparatus for continuously representing the magnitude of a signaling wave by code groups of signaling conditions, a delay device interconnected with said apparatus and individual to each of said signaling conditions forming a code group, each of said delay devices having a different delay interval, a transmission medium, means for applying the delayed signaling conditions to said medium in succession, receiving apparatus connected to said medium, an additional delay device connected to said receiving apparatus and individual to each of said signaling conditions forming a code group, each of said delay devices having a delay time such that the delay of all of said signaling conditions forming a code group through both delay devices individual thereto is substantially constant, and means for reconstructing said signalling wave from said delayed signaling conditions.

2. In a communication system coding apparatus for continuously coding the instantaneous amplitude of a complex wave by code groups of signaling conditions, each signal of which may comprise one of a plurality of significantly different characteristics, a distributor mechanism for successively allotting a predetermined interval of time for the transmission of each of said signaling conditions, a delay device individual to each of said signaling conditions of a code group connected between said coding apparatus and said distributor, each of said delay devices having a different delay interval such that the characteristics of the signaling conditions transmitted during the time allotted to each of said signaling conditions during one cycle of said distributor mechanism are controlled by the characteristics of the signaling conditions from said coding apparatus at the same discrete instant of time.

3. In a communication system a coding device comprising apparatus for continuously representing the instantaneous amplitude of a signaling wave form by means of a code having a plurality of elements each element of which may comprise any one of a plurality of different signaling conditions which are all substantially simultaneously determined, a time division multiplex transmission distributor means and a delay device for each code element connecting said multiplex transmission distributor means and said coding device, each of said delay devices having a different delay interval such that the characteristics of the code elements transmitted by said multiplex transmission distributor means in succession during one cycle of operation thereof are determined by the output of said coding device at a particular instant of time.

4. In a communication system apparatus for receiving time division multiplex code groups of signals representing a signaling wave, a plurality of delay lines, multiplex distributing apparatus for distributing received signals to a plurality of said delay lines, each of said lines having different delay intervals so related to each other and to said multiplex distributing apparatus that the signals of each multiplex group applied to said delay lines arrive at their output terminals substantially simultaneously and means for reconstructing the signaling wave from said simultaneously occurring signaling conditions.

5. In a communication system coding apparatus for simultaneously determining one of a plurality of different signaling conditions for each element of a multielement code group under control of the amplitude of a complex wave at predetermined intervals of time, pulse generating apparatus interconnected with said coding apparatus for generating a signaling pulse for each element of said code each time the signaling condition of said element changes, comprising a short circuited delay line connected to said pulse generating apparatus having a delay interval equal to one-half the time of said predetermined intervals of time for canceling the signaling condition applied thereto at the end of said predetermined interval of time.

6. In a communication system coding apparatus for simultaneously determining one of a plurality of different signaling conditions for each element of a code group under control of the amplitude of a signaling wave at predetermined intervals of time, pulse generating apparatus for generating a signaling pulse for each element of said code each time the signaling condition of said element changes, means for transmitting said signaling conditions to said pulse generating apparatus, a short circuited delay line connected to said pulse generating apparatus having a delay interval equal to one-half the time of said predetermined intervals of time for canceling the signaling condition applied thereto at the end of said interval of time, receiving apparatus comprising a double stability circuit for each code element, a transmission system for conveying said pulses from said pulse generating apparatus to said receiving apparatus, means for changing the condition of stability of said double stability circuit in response to each pulse supplied thereto and decoding apparatus connected to the output of said double stability circuits for regenerating the signaling wave.

7. In a communication system a cathode ray tube comprising means for forming a beam of electrons in the form of a flat sheet focussing said electrons on a target, a plurality of output code electrodes, means for deflecting said electrons over said target, apparatus responsive to a signaling wave, means for sampling such signaling wave at each of a plurality of instants of time, control means for deflecting said electron beam in accordance with said samples and means for maintaining said deflection constant between said sampling instants of time.

8. In a communication system a cathode ray coding tube for continuously representing the amplitude of a signaling wave by a code group of signaling conditions, means operating under control of an applied signal wave for substantially simultaneously changing the elements of said code groups, a single transmission path and transmission means for transmitting successive signal conditions over said single path representing the code group of said signaling conditions at predetermined instants of time.

9. In a communication system apparatus for instantaneously generating a complete code group of signaling conditions, control means responsive to applied signaling wave for substantially instantaneously and simultaneously changing the code of signaling conditions and pulse generating means including delay lines interconnected with said apparatus and controlled by said signaling conditions for generating successive pulses representing said signaling conditions.

10. In a communication system apparatus for instantaneously generating a complete multielement coded group of signaling conditions representing the amplitude of a signaling wave, apparatus responsive to an applied signaling wave for controlling the signaling condition of each element of said code, apparatus for generating a signaling pulse in response to a change of the signaling condition of each element of said code comprising means for canceling the effect of each change of said signaling conditions after a pulse interval.

11. In a communication system with a cathode-ray tube for representing the instantaneous magnitude of a signaling wave by code groups of signals, each signal of which may comprise a plurality of different characteristics, apparatus for delaying each one of said characteristics of a code by different intervals comprising time delay devices connected to said cathode-ray tube, means for generating signals controlled by said delay apparatus wherein said signals are generated in succession under control of said simultaneous code groups at a given instant of time thereof.

12. A combination in a communication system, coding apparatus for representing the instantaneous magnitude of the signal wave by code groups of signals each code group having a plurality of elements, each element of which may comprise any one of a plurality of different signaling conditions which are all substantially simultaneously determined, translating apparatus interconnected with said coding apparatus for translating said code representing the instantaneous amplitude of a wave to codes representing differences in amplitude represented by adjacent code groups, a time division multiplex system and delay device connecting said multiplex transmission system with said coding device whereby signals representing each code group are transmitted in succession.

13. In a communication system, apparatus for representing the instantaneous magnitude of a signaling wave by code groups of signals, each signal of which may comprise one of a plurality of different characteristics, said apparatus including coding means for substantially simultaneously determining the characteristics of each of said signals of a code group, means for transmitting characteristics of said signals in sequence comprising a distributor mechanism, a time delay device interconnecting to said distributor and said coding apparatus for each of said signals of a code group, said time delay devices having a progressively longer delay of intervals whereby the signals transmitted during one cycle of operation of said distributor mechanism are controlled by the characteristics of the signals from said instantaneous coding device at a given instant of time.

14. In a communication system, apparatus for receiving time division multiplex code groups of signals, a time delay device for each signal of a code group of signals, a multiplex distributor for distributing received signals of each code group to said delay devices, said delay devices having delay intervals so related to each other and to said multiplex distributing apparatus that the signals of each multiplex group applied to their inputs in successions arrive at the output terminals substantially simultaneously and combining means for combining said output signals from said delay devices into a single electrical output.

15. In a communication system, apparatus for receiving time division multiplex code groups of signals, time delay lines for each signal of a code group of signals, a multiplex distributor for distributing received signals of each code group to said delay lines, said delay lines having delay intervals so related to each other and to said multiplex distributing apparatus that the signals of each multiplex group applied to their inputs in successions arrive at the output terminals substantially simultaneously, combining means for combining said output signals from said delay lines into a single signal and means for reconstructing the complex wave from a succession of said single signals.

References Cited in the file of this patent

UNITED STATES PATENTS

| | | |
|---|---|---|
| 2,185,693 | Mertz | Jan. 2, 1940 |
| 2,213,938 | Bennett | Sept. 3, 1940 |
| 2,412,350 | Morgan | Dec. 10, 1946 |
| 2,418,116 | Grieg | Apr. 1, 1947 |
| 2,449,467 | Goodall | Sept. 14, 1948 |
| 2,451,044 | Pierce | Oct. 12, 1948 |
| 2,453,454 | Norwine | Nov. 9, 1948 |
| 2,453,461 | Schelleng | Nov. 9, 1948 |
| 2,478,919 | Hansell | Aug. 16, 1949 |
| 2,581,426 | Mason | Jan. 8, 1952 |
| 2,603,714 | Meacham | July 15, 1952 |